US012156056B2

(12) United States Patent
Hui

(10) Patent No.: US 12,156,056 B2
(45) Date of Patent: Nov. 26, 2024

(54) ELECTRONIC DEVICE, APPARATUS, AND METHOD FOR QUALITY EVALUATION AND ACCURACY IMPROVEMENT OF A WIRELESS SIGNAL

(71) Applicant: Huawei Technologies Co., Ltd., Shenzhen (CN)

(72) Inventor: Shaobo Hui, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 488 days.

(21) Appl. No.: 17/430,925

(22) PCT Filed: Oct. 28, 2019

(86) PCT No.: PCT/CN2019/113547
§ 371 (c)(1),
(2) Date: Aug. 13, 2021

(87) PCT Pub. No.: WO2020/164256
PCT Pub. Date: Aug. 20, 2020

(65) Prior Publication Data
US 2022/0132343 A1 Apr. 28, 2022

(30) Foreign Application Priority Data
Feb. 13, 2019 (CN) .......................... 201910112499.8

(51) Int. Cl.
*H04W 24/08* (2009.01)
*H04B 17/318* (2015.01)
*H04B 17/345* (2015.01)

(52) U.S. Cl.
CPC .......... *H04W 24/08* (2013.01); *H04B 17/318* (2015.01); *H04B 17/345* (2015.01)

(58) Field of Classification Search
CPC .... H04W 24/08; H04W 84/12; H04B 17/318; H04B 17/345; H04B 17/327; H04B 17/33
See application file for complete search history.

(56) References Cited

U.S. PATENT DOCUMENTS 11,350,288 B1 * 5/2022 Dennis ................. H04W 16/18
2010/0322171 A1 * 12/2010 Dekorsy ............... H04W 72/23
370/329

(Continued)

FOREIGN PATENT DOCUMENTS

CN 102307357 A 1/2012
CN 102461244 A 5/2012

(Continued)

OTHER PUBLICATIONS

Duan Zheng, Research on New Quality Evaluation Method of Wireless Broadband Network, Modern Science and Technology of Telecommunications, May 2014, 5 pages.

(Continued)

*Primary Examiner* — Benjamin H Elliott, IV
(74) *Attorney, Agent, or Firm* — Conley Rose, P.C.

(57) ABSTRACT

A wireless signal quality evaluation method includes a second electronic device sending a signal evaluation request to a first electronic device. The method further includes receiving an evaluation result from the first electronic device according to a specified period. The evaluation result includes a quality parameter of a wireless signal received by the first electronic device at a collection time and information about the collection time, and the quality parameter of the wireless signal is obtained through calculation using at least two of the following parameters: a strength parameter, an interference parameter, a standard parameter, a quantity of access paths, and a CQI of the wireless signal. The method further includes displaying the quality parameter of (Continued)

the wireless signal received by the first electronic device at the collection time.

20 Claims, 19 Drawing Sheets

(56) References Cited

U.S. PATENT DOCUMENTS

| | | | | |
|---|---|---|---|---|
| 2012/0040663 | A1* | 2/2012 | Kamdar | H04W 16/18 |
| | | | | 455/425 |
| 2012/0052828 | A1* | 3/2012 | Kamel | H04B 17/104 |
| | | | | 455/226.2 |
| 2013/0017825 | A1* | 1/2013 | Li | H04L 1/0029 |
| | | | | 455/425 |
| 2013/0130732 | A1* | 5/2013 | Sheu | H04W 16/18 |
| | | | | 455/507 |
| 2014/0226512 | A1* | 8/2014 | Kosugi | H04W 24/00 |
| | | | | 370/252 |
| 2015/0148066 | A1* | 5/2015 | Gilberton | H04W 4/023 |
| | | | | 455/456.1 |
| 2015/0312771 | A1* | 10/2015 | Li | H04W 24/02 |
| | | | | 455/446 |
| 2016/0269985 | A1* | 9/2016 | Bergström | H04W 48/18 |
| 2017/0041806 | A1* | 2/2017 | Randall | H04W 16/22 |
| 2017/0347274 | A1* | 11/2017 | Li | H04W 24/02 |
| 2018/0049040 | A1* | 2/2018 | Aoyama | H04W 16/32 |
| 2018/0049150 | A1* | 2/2018 | Chandwani | H04W 76/10 |
| 2020/0076518 | A1* | 3/2020 | Patel | H04W 64/003 |
| 2020/0280860 | A1* | 9/2020 | Egner | H04W 16/18 |
| 2022/0132343 | A1* | 4/2022 | Hui | H04B 17/345 |

FOREIGN PATENT DOCUMENTS

| | | |
|---|---|---|
| CN | 102594376 A | 7/2012 |
| CN | 102594499 A | 7/2012 |
| CN | 104753646 A | 7/2015 |
| CN | 105580443 A | 5/2016 |
| CN | 105761407 A | 7/2016 |
| CN | 105873122 A | 8/2016 |
| CN | 107454605 A | 12/2017 |
| CN | 107483075 A | 12/2017 |
| CN | 107819531 A | 3/2018 |
| CN | 108848527 A | 11/2018 |
| CN | 109039409 A | 12/2018 |
| EP | 2479908 A2 | 7/2012 |
| EP | 2785095 A1 | 10/2014 |
| EP | 3336782 A1 | 6/2018 |
| JP | 2002044729 A | 2/2002 |
| WO | 2016144495 A1 | 9/2016 |

OTHER PUBLICATIONS

Liu Jing, Research on Construction Scheme of TD-LTE Indoor Coverage, Jilin University, 2015, Issue 03, 2 pages.

Ye Jun, Research on TD-LTE Indoor Coverage Construction Solution, Information and Communications, 2015, Issue 11, 2 pages.

Xiasong, L., "Research on Small-Cell Higher Order Modulation Enhancement Method in LTE-A System," 2015, with an English Abstract, 82 pages.

* cited by examiner

ELECTRONIC DEVICE, APPARATUS, AND METHOD FOR QUALITY EVALUATION AND ACCURACY IMPROVEMENT OF A WIRELESS SIGNAL

CROSS-REFERENCE TO RELATED APPLICATIONS

This application is a U.S. National Stage of International Patent Application No. PCT/CN2019/113547, filed on Oct. 28, 2019, which claims priority to Chinese Patent Application No. 201910112499.8, filed on Feb. 13, 2019, both of which are hereby incorporated by reference in their entireties.

TECHNICAL FIELD

Embodiments of this application relate to the field of communications technologies, and in particular, to a wireless signal quality evaluation method, an electronic device, and a system.

BACKGROUND

Customer-premises equipment (customer premise equipment, CPE) is a device that can convert a wireless signal sent by a wireless base station into a wireless fidelity (wireless fidelity, Wi-Fi) signal. The wireless signal may include a 5G signal, a 4G signal, or the like. The CPE includes a SIM card interface for inserting a subscriber identification module (subscriber identification module, SIM) card. Alternatively, the CPE includes an embedded SIM card. Alternatively, the CPE may store a software-implemented SIM. The CPE may interact with the wireless base station through the SIM, to obtain the foregoing wireless signal. The CPE may be used in a house, a bus, a store, a remote area, or the like, and functions as a router to implement wireless network access, thereby reducing costs of wired network deployment.

Affected by factors such as a building layout, quality (such as wireless signal strength) of wireless signals received by the CPE at different indoor locations is different. To select an ideal location for placing the CPE, namely, a location at which the CPE receives a wireless signal with relatively high quality, a user may change a location of the CPE, so that the CPE evaluates quality of wireless signals received by the CPE at different locations.

Currently, the CPE may determine, based on reference signal received power (reference signal receiving power, RSRP) of the CPE, quality of a wireless signal received by the CPE at a current location. FIG. 1A shows a plane structure of a house, including a living room, a dining room, a bedroom, a study, a kitchen, and a bathroom. RSRP of wireless signals received by the CPE at different indoor locations is marked in the planar structural diagram of the house shown in FIG. 1A. The RSRP of the wireless signals received by the CPE at the different locations. For example, as shown in FIG. 1A, RSRP of a wireless signal received by the CPE at a location a in the living room is −73 decibel-milliwatts (dBm), RSRP of a wireless signal received by the CPE at a location b in the living room is −80 dBm, RSRP of a wireless signal received by the CPE at a location c in the bedroom is −95 dBm, and RSRP of a wireless signal received by the CPE at a location d on a balcony is −57 dBm. It can be learned from FIG. 1A that a maximum difference between the RSRP of the wireless signals received by the CPE at the different indoor locations reaches 38 decibels (dB). For example, a difference between the RSRP (namely, −95 dBm) of the wireless signal received by the CPE at the location c in the bedroom and the RSRP (namely, −57 dBm) of the wireless signal received by the CPE at the location d is 38 dB.

However, the RSRP is only one of many parameters representing wireless signal strength, and the quality of the wireless signal of the CPE is not entirely determined by the RSRP of the CPE. The quality of the wireless signal of the CPE may also be affected by another parameter. Therefore, the wireless signal quality determined based on only the RSRP is inaccurate.

SUMMARY

Embodiments of this application provide a wireless signal quality evaluation method, an electronic device, and a system, to improve accuracy of evaluating wireless signal quality by CPE.

According to a first aspect, an embodiment of this application provides an electronic device. The electronic device is a second electronic device, and the electronic device includes a processor, a memory, and a display. The memory is configured to store computer program code. The processor is configured to run the computer program code to enable the electronic device to perform the following operations: sending a signal evaluation request to a first electronic device; receiving an evaluation result sent by the first electronic device according to a specified period, where the evaluation result includes a quality parameter of a wireless signal received by the first electronic device at a collection time and information about the collection time; and displaying the quality parameter of the wireless signal received by the first electronic device at the collection time.

The quality parameter of the wireless signal is obtained through calculation by using at least two of the following parameters: a strength parameter (such as RSRP) of the wireless signal, an interference parameter of the wireless signal, a standard parameter of a network corresponding to the wireless signal, a quantity of access paths of the wireless signal, and a channel quality indicator (channel quality indicator, CQI) of the wireless signal. The interference parameter of the wireless signal may be a signal to interference plus noise ratio (signal to interference plus noise ratio, SINR). The standard parameter of the network corresponding to the wireless signal is used to indicate a standard of the network corresponding to the wireless signal, for example, a 4G network or a 5G network. The quantity of access paths of the wireless signal may be a rank of matrix (rank of the matrix, RANK).

In this embodiment of this application, the quality parameter of the wireless signal is obtained through calculation by using at least two of a plurality of parameters such as the RSRP, the SINR, the standard parameter, the RANK, and the CQI. The quality parameter of the wireless signal represents quality of the wireless signal. When the quality parameter of the wireless signal is calculated, reference is made to at least two parameters that affect the quality of the wireless signal received by the first electronic device. Therefore, accuracy of evaluating wireless signal quality can be improved.

With reference to the first aspect, in a possible design, the first electronic device may be CPE. The second electronic device (namely, the electronic device) may be a mobile phone, a tablet computer, or the like.

With reference to the first aspect, in another possible design, the processor is further configured to run the computer program code to enable the electronic device to perform the following operation: displaying a quality parameter of a wireless signal received by the first electronic device at a previous collection time. In other words, the electronic device may not only display a quality parameter of a wireless signal received by the first electronic device at a current collection time, but also display the quality parameter of the wireless signal received by the first electronic device at the previous collection time. The first electronic device may be located at different locations at different collection times. In this way, a user may select, based on a plurality of presented quality parameters, a location with relatively high wireless signal quality from a plurality of locations corresponding to different collection times, to place the first electronic device.

With reference to the first aspect, in another possible design, the evaluation result further includes the standard parameter, and the standard parameter is used to indicate a network standard of the wireless signal received by the first electronic device at the collection time. The processor is further configured to run the computer program code to enable the electronic device to perform the following operation: displaying the network standard of the wireless signal received by the first electronic device at the collection time. In this way, the user may learn, by using the network standard displayed by the electronic device, a network standard currently accessed by the first electronic device.

With reference to the first aspect, in another possible design, the processor is further configured to run the computer program code to enable the electronic device to perform the following operations: receiving an indication message, returned by the first electronic device, that indicates that the first electronic device is not attached to a wireless network; and displaying prompt information indicating that no wireless network is attached or a network connection fails.

With reference to the first aspect, in another possible design, the evaluation result further includes a recommendation index. The recommendation index is used to represent quality of a wireless signal received by the electronic device at the collection time, and the recommendation index is obtained through calculation by using the quality parameter of the wireless signal received by the first electronic device at the collection time. The processor is further configured to run the computer program code to enable the electronic device to perform the following operation: displaying the recommendation index based on the information about the collection time.

It may be understood that the recommendation index may represent quality of a wireless signal received by CPE 100 at the collection time. A higher recommendation index indicates higher quality of the wireless signal received by the CPE 100 at the collection time. A recommendation index of a wireless signal received by the first electronic device at a collection time may more intuitively indicate to the user a possibility of obtaining a wireless signal with relatively high quality by the first electronic device if the first electronic device is placed at a location corresponding to the collection time.

With reference to the first aspect, in another possible design, the processor is further configured to run the computer program code to enable the electronic device to perform the following operation: sending an alarm indication when the recommendation index is less than a specified index threshold. The alarm indication is used to prompt the user to change a location of the first electronic device. The specified index threshold is a positive integer greater than 0 and less than M. For example, when M=5, the specified index threshold may be 2 or 3. For example, the alarm indication may be a voice alarm indication. Alternatively, the second electronic device may display a reminder message including the alarm indication (for example, signal quality at this location is relatively poor, please move the CPE!).

With reference to the first aspect, in another possible design, the first electronic device can receive, only after being attached to the network, a wireless signal sent by a base station, and then can evaluate quality of the wireless signal received by the first electronic device. There may be specifically two cases in which the first electronic device is attached to the network: a case (1) in which the first electronic device is attached to any one of the 4G network, the 5G network, or the like; and a case (2) in which the first electronic device is attached to both the 4G network and the 5G network. The case (1) may be referred to as a single connectivity scenario, and the case (2) may be referred to as a dual connectivity (Dual Connectivity, DC) scenario.

In the DC scenario, the first electronic device is attached to the 4G network and the 5G network. In this case, the quality parameter of the wireless signal received by the first electronic device at the collection time includes a quality parameter $K_{5G}$ of a first wireless signal (for example, a 5G signal) received by the first electronic device at the collection time and a quality parameter $K_{4G}$ of a second wireless signal (for example, a 4G signal) received by the first electronic device at the collection time. The first wireless signal and the second wireless signal have different network standards.

The processor is specifically configured to run the computer program code to enable the electronic device to perform the following operations: displaying the quality parameter of the first wireless signal received by the first electronic device at the collection time, and displaying the quality parameter of the second wireless signal received by the first electronic device at the collection time. In other words, in the DC scenario, the electronic device may simultaneously display quality parameters of wireless signals received by the first electronic device in the two networks accessed by the first electronic device.

With reference to the first aspect, in another possible design, the processor is further configured to run the computer program code to enable the electronic device to perform the following operations: prompting the user to enter information about a current location of the first electronic device; and displaying the location information entered by the user. In other words, the user may name the current location of the first electronic device.

With reference to the first aspect, in another possible design, the processor is further configured to run the computer program code to enable the electronic device to perform the following operations: receiving and displaying load evaluation information of a cell that is sent by the first electronic device, where the load evaluation information of the cell represents a load status, at the collection time, of the cell accessed by the first electronic device.

In this embodiment of this application, the electronic device may present, to the user, not only quality parameters of wireless signals received by the first electronic device at a plurality of collection times, but also a load evaluation value of the cell accessed by the first electronic device. In this way, the user may select, with reference to the quality parameter of the wireless signal of the first electronic device and the load evaluation value of the accessed cell, a location with relatively high wireless signal quality and relatively low load to place the first electronic device.

With reference to the first aspect, in another possible design, when the user selects, with reference to the quality parameter of the wireless signal and the load evaluation value of the cell, the location for placing the first electronic device, there may be some locations with relatively high wireless signal quality but relatively large cell load evaluation values, or some other locations with relatively poor wireless signal quality but relatively small cell load evaluation values. In this case, it is difficult for the user to comprehensively evaluate the quality parameter of the wireless signal and the load evaluation value of the cell. Based on this case, the user may operate the electronic device to control the first electronic device to comprehensively evaluate quality parameters of wireless signals received by the first electronic device at a plurality of locations and load evaluation values of cells. Specifically, the processor is further configured to run the computer program code to enable the electronic device to perform the following operations: sending a comprehensive evaluation request to the first electronic device; and receiving and displaying a comprehensive evaluation value, sent by the first electronic device, of the wireless signal received by the first electronic device at the collection time. The comprehensive evaluation value is obtained through calculation by using the quality parameter of the wireless signal received by the first electronic device at the collection time and the load status, at the collection time, of the cell accessed by the first electronic device.

According to a second aspect, an embodiment of this application provides an electronic device. The electronic device is a first electronic device, and the electronic device includes a processor, a memory, and a display. The memory is configured to store computer program code. The processor is configured to run the computer program code to enable the electronic device to perform the following operations: receiving a signal evaluation request sent by a second electronic device; and in response to the signal evaluation request, performing the following operations according to a specified period: obtaining an evaluation parameter of a wireless signal received by the electronic device, calculating, based on the evaluation parameter, a quality parameter of the wireless signal received by the electronic device, and sending an evaluation result to the second electronic device, where the evaluation result includes a quality parameter of a wireless signal received by the electronic device at a collection time and information about the collection time.

The evaluation parameter includes at least two of the following parameters: a strength parameter of the wireless signal, an interference parameter of the wireless signal, a standard parameter of a network corresponding to the wireless signal, a quantity of access paths of the wireless signal, and a CQI of the wireless signal.

In this embodiment of this application, the electronic device may calculate, based on at least two of a plurality of parameters such as RSRP, a SINR, the standard parameter, a RANK, and the CQI, the quality parameter of the wireless signal received by the electronic device. The quality parameter of the wireless signal represents quality of the wireless signal. When calculating the quality parameter of the wireless signal, the electronic device refers to at least two parameters that affect the quality of the wireless signal received by the electronic device. Therefore, accuracy of evaluating wireless signal quality by the electronic device can be improved.

With reference to the second aspect, in a possible design, the evaluation result further includes the standard parameter, and the standard parameter is used to indicate the network standard of the wireless signal received at the collection time.

With reference to the second aspect, in another possible design, the processor is further configured to run the computer program code to enable the electronic device to perform the following operation: when the electronic device is not attached to a wireless network or fails to be connected to a network, sending, to the second electronic device, an indication message indicating that no wireless network is attached.

With reference to the second aspect, in another possible design, the evaluation result further includes a recommendation index, and the recommendation index is used to represent the quality of the wireless signal received by the electronic device at the collection time. The processor is further configured to run the computer program code to enable the electronic device to perform the following operation: calculating the recommendation index based on the quality parameter of the wireless signal received by the electronic device at the collection time.

With reference to the second aspect, in another possible design, the quality parameter of the wireless signal received by the electronic device at the collection time includes a quality parameter of a first wireless signal received by the electronic device at the collection time and a quality parameter of a second wireless signal received by the electronic device at the collection time. The first wireless signal and the second wireless signal have different network standards. The processor is further configured to run the computer program code to enable the electronic device to perform the following operation: searching a specified recommendation index table for recommendation indexes corresponding to the quality parameter of the first wireless signal and the quality parameter of the second wireless signal.

With reference to the second aspect, in another possible design, the processor is further configured to run the computer program code to enable the electronic device to perform the following operation: indicating the second electronic device to send an alarm indication when the recommendation index is less than a specified index threshold, where the alarm indication is used to prompt a user to change a location of the electronic device.

With reference to the second aspect, in another possible design, the quality parameter of the wireless signal received by the electronic device at the collection time includes the quality parameter of the first wireless signal received by the electronic device at the collection time and the quality parameter of the second wireless signal received by the electronic device at the collection time. The first wireless signal and the second wireless signal have different network standards. The processor is further configured to run the computer program code to enable the electronic device to perform the following operations: obtaining an evaluation parameter of the first wireless signal received by the electronic device, and calculating, based on the evaluation parameter of the first wireless signal received by the electronic device, the quality parameter of the first wireless signal received by the electronic device; and obtaining an evaluation parameter of the second wireless signal received by the electronic device, and calculating, based on the evaluation parameter of the second wireless signal received by the electronic device, the quality parameter of the second wireless signal received by the electronic device.

With reference to the second aspect, in another possible design, the processor is specifically configured to run the computer program code to enable the electronic device to perform the following operation: calculating, by using the following formula, a quality parameter K of the wireless signal received by the electronic device at the collection time:

$$K = A_{RSPR} \times a - B_{SINR} \times b + C \times c + D_{RANK} \times d + E_{CQI} \times e.$$

The $A_{RSPR}$ is a value of RSRP of the electronic device, the $B_{SINR}$ is a value of a SINR of the electronic device, C is a standard parameter of the wireless signal received by the electronic device, the $D_{RANK}$ is a value of a RANK, a is a weighted value of the RSRP, b is a weighted value of the SINR, c is a weighted value of the standard parameter, d is a weighted value of the RANK, and e is a weighted value of the CQI.

With reference to the second aspect, in another possible design, the processor is further configured to run the computer program code to enable the electronic device to perform the following operations: sending a load request to a wireless base station, where the load request is used to obtain a load status, at the collection time, of a cell accessed by the electronic device; receiving load evaluation information of the cell that is sent by the wireless base station, where the load evaluation information of the cell represents the load status, at the collection time, of the cell accessed by the electronic device; and sending the load evaluation information of the cell to the second electronic device.

With reference to the second aspect, in another possible design, the processor is further configured to run the computer program code to enable the electronic device to perform the following operations: receiving a comprehensive evaluation request sent by the second electronic device; in response to the comprehensive evaluation request, calculating, based on the quality parameter of the wireless signal received by the electronic device at the collection time and the load status, at the collection time, of the cell accessed by the electronic device, a comprehensive evaluation value of the wireless signal received by the electronic device at the collection time; and sending, to the second electronic device, the comprehensive evaluation value of the wireless signal received by the electronic device at the collection time.

With reference to the second aspect, in another possible design, the evaluation result further includes location information corresponding to the collection time. The processor is further configured to run the computer program code to enable the electronic device to perform the following operation: obtaining location information corresponding to the electronic device at the collection time.

With reference to the second aspect, in another possible design, the electronic device is CPE, and the second electronic device is a mobile phone or a tablet computer.

It may be understood that, for beneficial effects that can be achieved by the electronic device in the second aspect and any possible design of the second aspect, refer to beneficial effects in the first aspect and any possible design of the first aspect. Details are not described herein again.

According to a third aspect, an embodiment of this application provides an electronic device. The electronic device is a second electronic device, and the electronic device includes a processor, a memory, and a display. The memory is configured to store computer program code. The processor is configured to run the computer program code to enable the electronic device to perform the following operations: sending a signal evaluation request to a first electronic device; receiving an evaluation result sent by the first electronic device according to a specified distance interval, where the evaluation result includes a quality parameter of a wireless signal received by the first electronic device at a collection location and information about the collection location; and displaying the quality parameter of the wireless signal received by the first electronic device at the collection location. The quality parameter of the wireless signal is obtained through calculation by using at least two of the following parameters: a strength parameter of the wireless signal, an interference parameter of the wireless signal, a network standard parameter of the wireless signal, a quantity of access paths of the wireless signal, and a CQI of the wireless signal.

In this embodiment of this application, the quality parameter of the wireless signal is obtained through calculation by using at least two of a plurality of parameters such as RSRP, a SINR, the standard parameter, a RANK, and the CQI. The quality parameter of the wireless signal represents quality of the wireless signal. When the quality parameter of the wireless signal is calculated, reference is made to at least two parameters that affect the quality of the wireless signal received by the first electronic device. Therefore, accuracy of evaluating wireless signal quality can be improved.

With reference to the third aspect, in a possible design, the processor is further configured to run the computer program code to enable the electronic device to perform the following operation: displaying a quality parameter of a wireless signal received by the first electronic device at a previous collection location. In this embodiment of this application, quality parameters of wireless signals received by the electronic device at different collection locations may further be presented to a user. In this way, the user may select a location with relatively high wireless signal quality from a plurality of collection locations based on a plurality of presented quality parameters, to place the electronic device.

With reference to the third aspect, in another possible design, the evaluation result further includes the standard parameter, and the standard parameter is used to indicate a network standard of the wireless signal received by the first electronic device at the collection location. The processor is further configured to run the computer program code to enable the electronic device to perform the following operation: displaying the network standard of the wireless signal received by the first electronic device at the collection location.

With reference to the third aspect, in another possible design, the processor is further configured to run the computer program code to enable the electronic device to perform the following operations: receiving an indication message, returned by the first electronic device, that indicates that the first electronic device is not attached to a wireless network; and displaying prompt information indicating that no wireless network is attached or a network connection fails.

With reference to the third aspect, in another possible design, the evaluation result further includes a recommendation index. The recommendation index is used to represent quality of a wireless signal received by the electronic device at the collection location, and the recommendation index is obtained through calculation by using the quality parameter of the wireless signal received by the first electronic device at the collection location. The processor is further configured to run the computer program code to enable the electronic device to perform the following operation: displaying the recommendation index based on the information about the collection location.

With reference to the third aspect, in another possible design, the processor is further configured to run the computer program code to enable the electronic device to perform the following operation: sending an alarm indication when the recommendation index is less than a specified index threshold, where the alarm indication is used to prompt the user to change a location of the first electronic device.

With reference to the third aspect, in another possible design, the quality parameter of the wireless signal received by the first electronic device at the collection location includes a quality parameter of a first wireless signal received by the first electronic device at the collection location and a quality parameter of a second wireless signal received by the first electronic device at the collection location. The first wireless signal and the second wireless signal have different network standards. The processor is specifically configured to run the computer program code to enable the electronic device to perform the following operations: displaying the quality parameter of the first wireless signal received by the first electronic device at the collection location, and displaying the quality parameter of the second wireless signal received by the first electronic device at the collection location.

With reference to the third aspect, in another possible design, the processor is further configured to run the computer program code to enable the electronic device to perform the following operations: prompting the user to enter location information of the first electronic device; and displaying the location information entered by the user.

With reference to the third aspect, in another possible design, the processor is further configured to run the computer program code to enable the electronic device to perform the following operations: receiving and displaying load evaluation information of a cell that is sent by the first electronic device, where the load evaluation information of the cell represents a load status, at the collection location, of the cell accessed by the first electronic device.

With reference to the third aspect, in another possible design, the processor is further configured to run the computer program code to enable the electronic device to perform the following operations: sending a comprehensive evaluation request to the first electronic device; and receiving and displaying a comprehensive evaluation value, sent by the first electronic device, of the wireless signal received by the first electronic device at the collection location, where the comprehensive evaluation value is obtained through calculation by using the quality parameter of the wireless signal received by the first electronic device at the collection location and the load status, at the collection location, of the cell accessed by the first electronic device.

With reference to the third aspect, in another possible design, the first electronic device is CPE, and the second electronic device is a mobile phone or a tablet computer.

According to a fourth aspect, an embodiment of this application provides an electronic device. The electronic device is a first electronic device, and the electronic device includes a processor, a memory, and a display. The memory is configured to store computer program code. The processor is configured to run the computer program code to enable the electronic device to perform the following operations: receiving a signal evaluation request sent by a second electronic device; and in response to the signal evaluation request, performing the following operations according to a specified distance interval: obtaining an evaluation parameter of a wireless signal received by the electronic device, calculating, based on the evaluation parameter, a quality parameter of the wireless signal received by the electronic device, and sending an evaluation result to the second electronic device, where the evaluation result includes a quality parameter of a wireless signal received by the electronic device at a collection location and information about the collection location. The evaluation parameter includes at least two of the following parameters: a strength parameter of the wireless signal, an interference parameter of the wireless signal, a standard parameter of a network corresponding to the wireless signal, a quantity of access paths of the wireless signal, and a CQI of the wireless signal.

With reference to the fourth aspect, in a possible design, the evaluation result further includes the standard parameter, and the standard parameter is used to indicate a network standard of the wireless signal received at the collection location.

With reference to the fourth aspect, in another possible design, the evaluation result further includes a recommendation index, and the recommendation index is used to represent quality of the wireless signal received by the electronic device at the collection location. The processor is further configured to run the computer program code to enable the electronic device to perform the following operation: calculating the recommendation index based on the quality parameter of the wireless signal received by the electronic device at the collection location.

With reference to the fourth aspect, in another possible design, the quality parameter of the wireless signal received by the electronic device at the collection location includes a quality parameter of a first wireless signal received by the electronic device at the collection location and a quality parameter of a second wireless signal received by the electronic device at the collection location. The first wireless signal and the second wireless signal have different network standards. The processor is further configured to run the computer program code to enable the electronic device to perform the following operation: searching a specified recommendation index table for recommendation indexes corresponding to the quality parameter of the first wireless signal and the quality parameter of the second wireless signal.

With reference to the fourth aspect, in another possible design, the quality parameter of the wireless signal received by the electronic device at the collection location includes the quality parameter of the first wireless signal received by the electronic device at the collection location and the quality parameter of the second wireless signal received by the electronic device at the collection location. The first wireless signal and the second wireless signal have different network standards. The processor is further configured to run the computer program code to enable the electronic device to perform the following operations: obtaining an evaluation parameter of the first wireless signal received by the electronic device, and calculating, based on the evaluation parameter of the first wireless signal received by the electronic device, the quality parameter of the first wireless signal received by the electronic device; and obtaining an evaluation parameter of the second wireless signal received by the electronic device, and calculating, based on the evaluation parameter of the second wireless signal received by the electronic device, the quality parameter of the second wireless signal received by the electronic device.

With reference to the fourth aspect, in another possible design, the processor is further configured to run the computer program code to enable the electronic device to perform the following operations: sending a load request to a wireless base station, where the load request is used to obtain a load status, at the collection location, of a cell accessed by the electronic device; receiving load evaluation information of the cell that is sent by the wireless base station, where the load evaluation information of the cell represents the load status, at the collection location, of the cell accessed by the electronic device; and sending the load evaluation information of the cell to the second electronic device.

With reference to the fourth aspect, in another possible design, the processor is further configured to run the computer program code to enable the electronic device to perform the following operations: receiving a comprehensive evaluation request sent by the second electronic device; in response to the comprehensive evaluation request, calculating, based on the quality parameter of the wireless signal received by the electronic device at the collection location and the load status, at the collection location, of the cell accessed by the electronic device, a comprehensive evaluation value of the wireless signal received by the electronic device at the collection location; and sending, to the second electronic device, the comprehensive evaluation value of the wireless signal received by the electronic device at the collection location.

With reference to the fourth aspect, in another possible design, the processor is specifically configured to run the computer program code to enable the electronic device to perform the following operation: calculating, by using the following formula, a quality parameter K of the wireless signal received by the electronic device at the collection location:

$$K = A_{RSPR} \times a - B_{SINR} \times b + C \times c + D_{RANK} \times d + E_{CQI} \times e.$$

The $A_{RSPR}$ is a value of RSRP of the electronic device, the $B_{SINR}$ is a value of a SINR of the electronic device, C is a standard parameter of the wireless signal received by the electronic device, the $D_{RANK}$ is a value of a RANK, a is a weighted value of the RSRP, b is a weighted value of the SINR, c is a weighted value of the standard parameter, d is a weighted value of the RANK, and e is a weighted value of the CQI.

With reference to the fourth aspect, in another possible design, the electronic device is CPE, and the second electronic device is a mobile phone or a tablet computer.

According to a fifth aspect, an embodiment of this application provides a computer storage medium. The computer storage medium includes computer instructions, and when the computer instructions are run on the electronic device according to any one of the foregoing aspects and the possible designs of the foregoing aspects, the electronic device is enabled to perform a function of a corresponding module.

According to a sixth aspect, an embodiment of this application provides a computer program product. When the computer program product runs on a computer, the computer is enabled to perform a function of a corresponding module in the electronic device according to any one of the foregoing aspects and the possible designs of the foregoing aspects.

According to a seventh aspect, an embodiment of this application provides a wireless signal quality evaluation system. The system includes the second electronic device according to the first aspect and any possible design of the first aspect, the first electronic device according to the second aspect and any possible design of the second aspect, and a cloud server. Alternatively, the system includes the second electronic device according to the third aspect and any possible design of the third aspect, the first electronic device according to the fourth aspect and any possible design of the fourth aspect, and a cloud server.

The cloud server is configured to receive a signal evaluation request, sent by the second electronic device, of an application (Application, APP). The APP is configured to control the first electronic device to evaluate quality of a wireless signal. The signal evaluation request is used to request the first electronic device to evaluate quality of a wireless signal received by the first electronic device. The cloud server is further configured to send the signal evaluation request to the first electronic device, receive an evaluation result sent by the first electronic device, and send the evaluation result to the second electronic device. The evaluation result includes a quality parameter of a wireless signal received by the first electronic device at a collection time or a collection location and information about the collection time or the collection location.

It may be understood that, for beneficial effects that can be achieved by the electronic device according to any one of the second aspect, the third aspect, the fourth aspect, or the possible designs thereof, the computer storage medium according to the fifth aspect, the computer program product according to the sixth aspect, and the system according to the seventh aspect, refer to the first aspect and any possible design of the first aspect. Details are not described herein again.

DESCRIPTION OF EMBODIMENTS

The following describes implementations of the embodiments of this application in detail with reference to accompanying drawings.

A wireless signal quality evaluation method provided in the embodiments of this application may be applied to a communications system including a first electronic device, one or more second electronic devices, and one or more wireless base stations.

The first electronic device may communicate with the one or more wireless base stations and be attached to a network through a subscriber identification module (subscriber identification module, SIM). In addition, after being attached to the network, the first electronic device may receive a wireless signal sent by the wireless base station, and convert the wireless signal into a Wi-Fi signal, to provide a Wi-Fi network for another electronic device. The second electronic device may access the Wi-Fi network provided by the first electronic device.

For example, the first electronic device may be CPE (for example, CPE 100 shown in FIG. 1), a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)\virtual reality (virtual reality, VR) device, or the like. A specific form of the first electronic device is not particularly limited in the embodiments of this application.

For example, the second electronic device may be a device having a Wi-Fi access capability. For example, the second electronic device may be a mobile phone (for example, a mobile phone 300 in FIG. 1), a tablet computer, a desktop computer, a laptop computer, a handheld computer, a notebook computer, a UMPC, a netbook, a cellular phone, a PDA, an AR\VR device, a media player device, or the like. Alternatively, the second electronic device may be a smart speaker, a smart television, a refrigerator, a washing machine, an air conditioner, an air purifier, a kitchen supply, or another home device. A specific form of the second electronic device is not particularly limited in the embodiments of this application.

Figure 1:
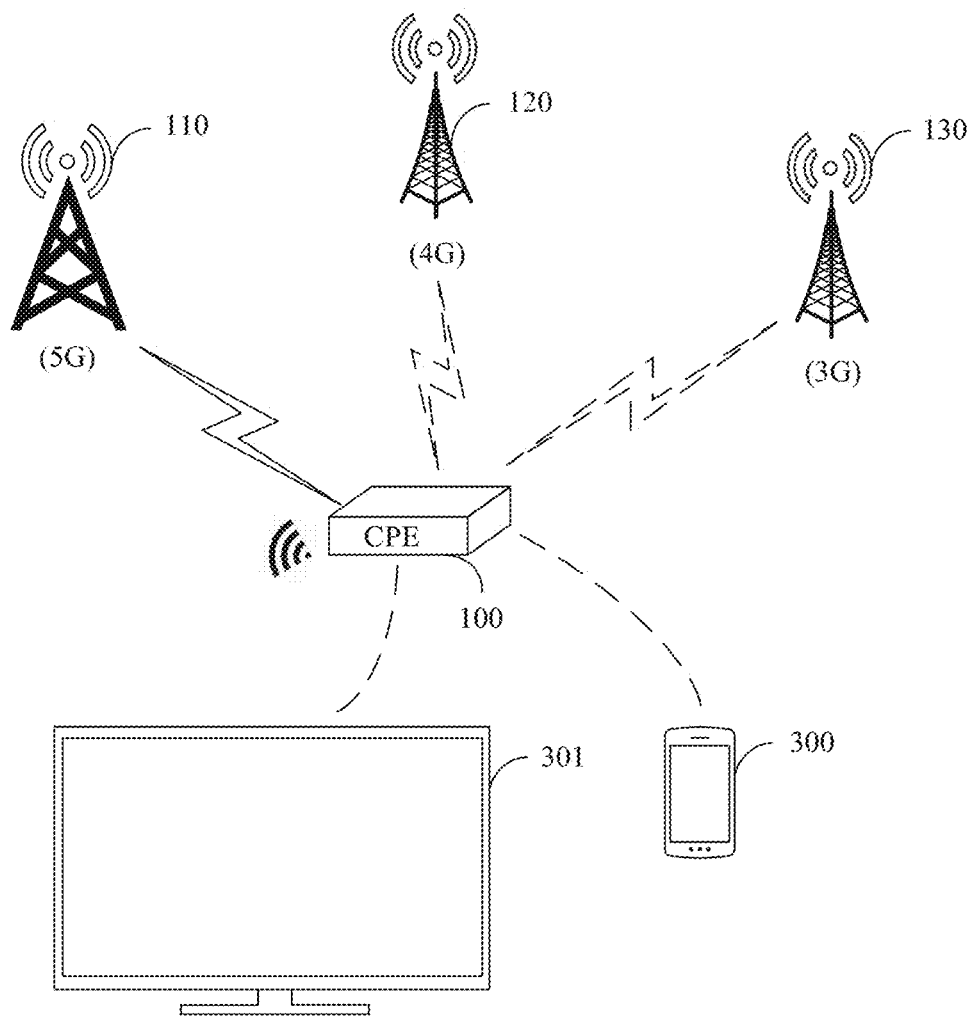
FIG. 1 is a schematic diagram of an architecture of a communications system to which a method according to an embodiment of this application is applied.

For example, the wireless signal quality evaluation method provided in the embodiments of this application may be applied to a communications system shown in FIG. 1. As shown in FIG. 1, the communications system includes a 5G base station 110, a 4G base station 120, a 3G base station 130, the CPE 100, the mobile phone 300, and a smart television 301. The 5G base station 110, the 4G base station 120, and the 3G base station 130 are the foregoing plurality of wireless base stations. The CPE 100 is the foregoing first electronic device. The mobile phone 300 and the smart television 301 are the foregoing second electronic devices.

Interaction between the 5G base station 110, the CPE 100, and the mobile phone 300 in the communications system shown in FIG. 1 is used as an example. After accessing a network provided by the 5G base station 100, the CPE 100 may receive a wireless signal (namely, a 5G signal) of the 5G base station 100. The CPE 100 may convert the wireless signal into a Wi-Fi signal to provide a Wi-Fi network to another electronic device. The mobile phone 300 may access the Wi-Fi network provided by the CPE 100.

It should be noted that parameters that affect quality of a wireless signal received by the CPE 100 not only includes a strength parameter (such as RSRP) of the wireless signal, but also may include at least one of a plurality of parameters such as an interference parameter of the wireless signal, a standard parameter of a network corresponding to the wireless signal, and a quantity of access paths of the wireless signal, and a CQI of the wireless signal. The interference parameter of the wireless signal may be a SINR. The standard parameter of the network corresponding to the wireless signal is used to indicate a standard of the network corresponding to the wireless signal, for example, a 4G network or a 5G network. The quantity of access paths of the wireless signal may be a RANK.

Figure 1A:
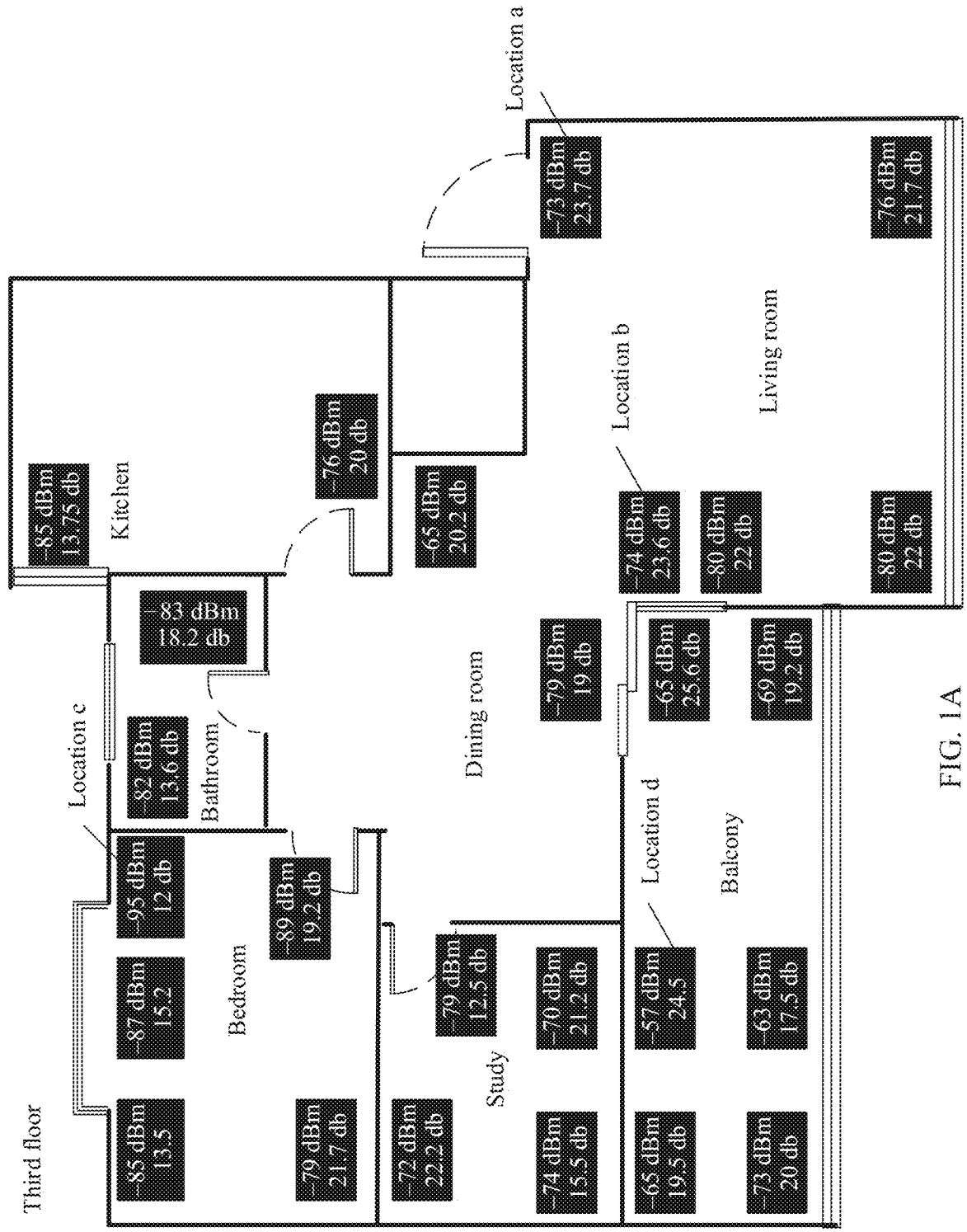
FIG. 1A is a schematic diagram of a plane structure of a house according to an embodiment of this application.

For example, the SINR is used as an example. As shown in FIG. 1A, SINRs of wireless signals received by the CPE at different indoor locations are different. For example, as shown in FIG. 1A, a SINR of a wireless signal received by the CPE at a location a in a living room is 23.7 dB, a SINR of a wireless signal received by the CPE at a location b in the living room is 23.6 dB, a SINR of a wireless signal received by the CPE at a location c in a bedroom is 12 dB, and a SINR of a wireless signal received by the CPE at a location d on a balcony is 24.5 dB.

In this embodiment of this application, the CPE 100 may calculate, based on at least two of a plurality of parameters such as the RSRP, the SINR, the standard parameter, the RANK, and the CQI, a quality parameter of the wireless signal received by the CPE 100. The quality parameter of the wireless signal represents the quality of the wireless signal. When calculating the quality parameter of the wireless signal, the CPE 100 refers to at least two parameters that affect the quality of the wireless signal received by the electronic device. Therefore, accuracy of evaluating wireless signal quality by the CPE 100 can be improved.

Further, in this embodiment of this application, quality parameters of wireless signals received by the CPE 100 at different collection times may be presented to a user. The CPE 100 may be located at different locations at the different collection times. In this case, the user may select, based on a plurality of presented quality parameters, a location with relatively high wireless signal quality from a plurality of locations corresponding to different collection times, to place the CPE 100.

Further, in this embodiment of this application, quality parameters of wireless signals received by the CPE 100 at different collection locations may further be presented to the user. In this case, the user may select a location with relatively high wireless signal quality from a plurality of collection locations based on a plurality of presented quality parameters, to place the CPE 100.

Figure 2:
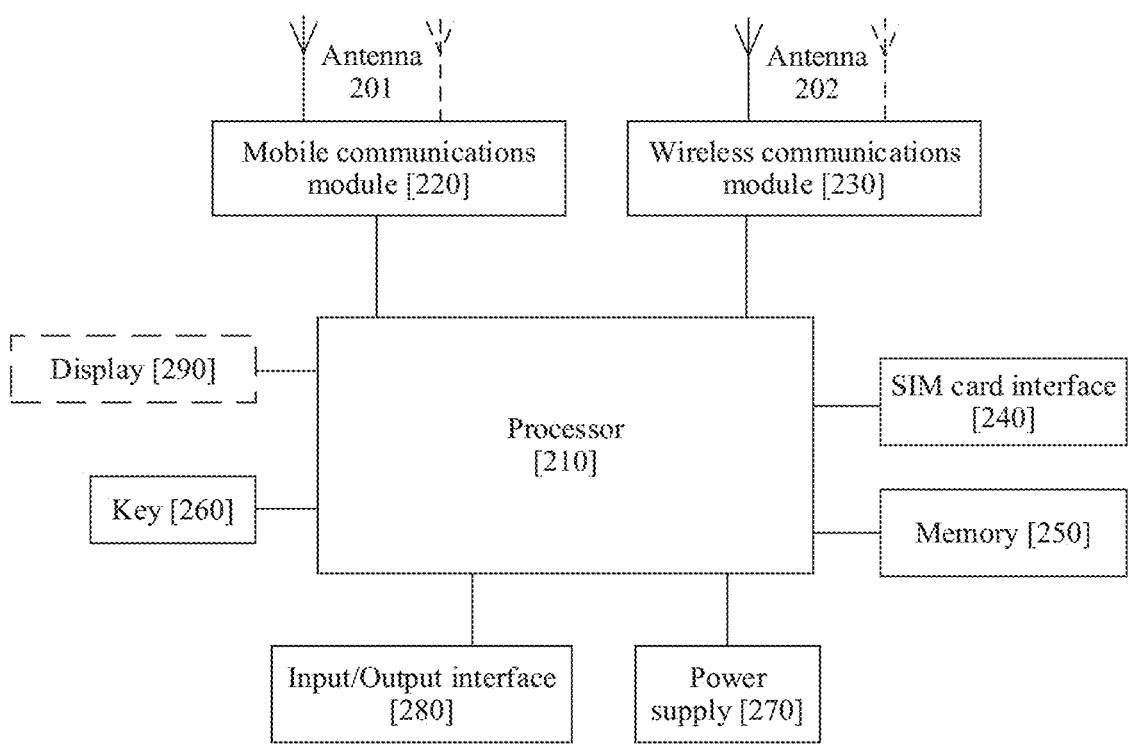
FIG. 2 is a schematic structural diagram of CPE according to an embodiment of this application.

FIG. 2 is a schematic structural diagram of CPE according to an embodiment of this application. As shown in FIG. 2, CPE 100 may include a processor 210, a mobile communications module 220, a wireless communications module 230, a SIM card interface 240, a memory 250, a key 260, a power supply 270, an input/output interface 280, an antenna 201, and an antenna 202. Optionally, the CPE 100 may further include a display 290.

The memory 250 may be configured to store program code, for example, program code used to convert a wireless signal into a Wi-Fi signal and provide a Wi-Fi network for a mobile phone 300, a smart television 301, and the like. The processor 210 may execute the program code, to implement a function of the CPE 100 in this embodiment of this application. The processor 210 may include one or more processing units. For example, the processor 210 may include a modem processor, a digital signal processor (digital signal processor, DSP), a baseband processor, and the like. Different processing units may be independent devices, or may be integrated into one or more processors. The memory 250 may further store address information used to uniquely identify the CPE 100. For example, the address information may be a (media access control, MAC) address. In addition, the memory 250 may further store a phone number corresponding to a SIM card inserted into the SIM card interface 240.

The SIM card interface 240 is configured to connect to a SIM card. The SIM card may be inserted into the SIM card interface 240 or plugged from the SIM card interface 240, to implement contact with or separation from the CPE 100. The CPE 100 may support one or N SIM card interfaces, where N is a positive integer greater than 1. The SIM card interface 240 may support a nano-SIM card, a micro-SIM card, a SIM card, and the like. A plurality of cards may be simultaneously inserted in a same SIM card interface 240. The plurality of cards may be of a same type or of different types. The SIM card interface 395 may be compatible with different types of SIM cards. The SIM card interface 240 may also be compatible with an external storage card. The CPE 100 interacts with a network through the SIM card, to implement functions such as calling and data communication. In some embodiments, the CPE 100 uses an eSIM, namely, an embedded SIM card. The eSIM card may be embedded into the CPE 100, and cannot be separated from the CPE 100. It should be noted that the CPE 100 may alternatively not include the SIM card interface 240. The memory 250 may store program code used to implement a SIM function. The processor 210 may execute the program code, to implement the SIM function, and communicate with a wireless base station through the mobile communications module 220.

A wireless communication function of the CPE 100 may be implemented through the antenna 201, the antenna 202, the mobile communications module 220, the wireless communications module 230, the modem processor, the baseband processor, and the like.

The antenna 201 and the antenna 202 are configured to transmit and receive electromagnetic wave signals. Each antenna in the CPE 100 may be configured to cover one or more communications frequency bands. Different antennas may further be multiplexed to improve antenna utilization. For example, the antenna 201 may be multiplexed as a diversity antenna in a wireless local area network. In some other embodiments, the antenna may be used in combination with a tuning switch.

The mobile communications module 220 may provide at least one function to which a wireless communications technology such as 2G, 3G, 4G, or 5G is applied. The mobile communications module 220 may include at least one filter, a switch, a power amplifier, a low noise amplifier (low noise amplifier, LNA), and the like. The antenna 201 of the CPE 100 is coupled to the mobile communications module 220. The mobile communications module 220 may receive an electromagnetic wave through the antenna 201, perform processing such as filtering or amplification on the received electromagnetic wave, and transmit a processed electromagnetic wave to the modem processor for demodulation. The mobile communications module 220 may further amplify a signal modulated by the modem processor, and convert the signal into an electromagnetic wave for radiation through the antenna 201. In some embodiments, at least some function modules of the mobile communications module 220 may be disposed in the processor 210. In some embodiments, at least some function modules of the mobile communications module 220 and at least some modules of the processor 210 may be disposed in a same device.

The wireless communications module 230 may provide at least one function to which a wireless communications technology such as a wireless local area network (wireless local area networks, WLAN) (for example, a Wi-Fi network), Bluetooth (bluetooth, BT), a global navigation satellite system (global navigation satellite system, GNSS), frequency modulation (frequency modulation, FM), a near field communication (near field communication, NFC) technology, or an infrared (infrared, IR) technology is applied. The wireless communications module 230 may be one or more components integrating at least one communications processor module. The antenna 202 is coupled to the wireless communications module 230. The wireless communications module 230 receives an electromagnetic wave through the antenna 202, performs frequency modulation and filtering processing on an electromagnetic wave signal, and sends a processed signal to the processor 210. The wireless communications module 230 may further receive a to-be-sent signal from the processor 210, perform frequency modulation and amplification on the signal, and convert the signal into an electromagnetic wave for radiation through the antenna 202. For example, in this embodiment of this application, the wireless communications module 230 may be a Wi-Fi module, configured to provide a Wi-Fi function.

The input/output interface 280 may include one or more USB interfaces and one or more local area network (local area network interface, LAN) interfaces. The USB interface is an interface that conforms to a USB standard specification, and may be specifically a mini USB interface, a micro USB interface, a USB Type-C port, or the like. The USB interface may be connected to a charger to charge the CPE 100. Alternatively, the interface may be configured to connect to another electronic device such as an AR device.

The LAN may be configured to insert a telephone line to connect to a telephone set. After the LAN of the CPE 100 is connected to the telephone set, the telephone set may use the SIM card inserted into the SIM card interface 240 of the CPE 100 to make or answer a call. The LAN may alternatively be configured to insert a network cable to connect to a computer, or may be configured to insert a network cable to connect to a smart television, or the like. After the LAN of the CPE 100 is connected to the computer or the smart television, the computer or the smart television may use a wireless signal of the mobile communications module 220 of the CPE 100. In other words, the CPE 100 in this embodiment of this application may not only provide a wireless Wi-Fi network for an electronic device (for example, a mobile phone, a computer, or a smart home device), but also provide an interface for connecting to devices such as a telephone set, a computer, and a smart television, to provide a wired communication service for the devices such as the telephone set, the computer, and the smart television.

The power supply 270 may be configured to supply power to each component included in the CPE 100. In some embodiments, the power supply 270 may be a battery, for example, a rechargeable battery.

The key 260 may include a power key and a reset key. The power key is used to power on or off the CPE 100. The reset key is used to restore factory settings of the CPE 100. Certainly, the key 260 may further include another key. For example, when the CPE 100 includes the display 290, the key 260 may further include a key used to trigger screen-on of the display 290. The key 260 may be a mechanical key or a touch key. The CPE 100 may receive a key input, and generate a key signal input related to a user setting and function control of the CPE 100.

The CPE 100 may further include a charging management module and a power management module. For detailed descriptions of the charging management module and the power management module, refer to the descriptions of the charging management module and the power management module of the mobile phone 300 in the embodiments of this application. Details are not described herein again in this embodiment of this application.

The display 290 is configured to display an image, a video, and the like. The display 290 includes a display panel. A liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like may be used for the display panel.

In some embodiments, the CPE 100 may send an evaluation result of the CPE 100 to another electronic device (for example, the mobile phone 300). The another electronic device displays the evaluation result of the CPE 100. The CPE 100 may send the evaluation result to the another electronic device through the mobile communications module 220. Alternatively, the CPE 100 may send the evaluation result to the another electronic device through the wireless communications module 230 (that is, through the Wi-Fi network, the Bluetooth, or the like). In some other embodiments, the CPE 100 may display the evaluation result of the CPE 100 on the display 290.

It may be understood that a structure shown in this embodiment of this application does not constitute a specific limitation on the CPE 100. The CPE 100 may have more or fewer components than those shown in FIG. 2, or may combine two or more components, or may have different component configurations. For example, the CPE 100 may further include an indicator light, and the indicator light may be configured to indicate a charging status, a power change, or the like. Various components shown in FIG. 2 may be implemented in hardware, software, or a combination of hardware and software that includes one or more signal processing or application-specific integrated circuits.

Figure 3:
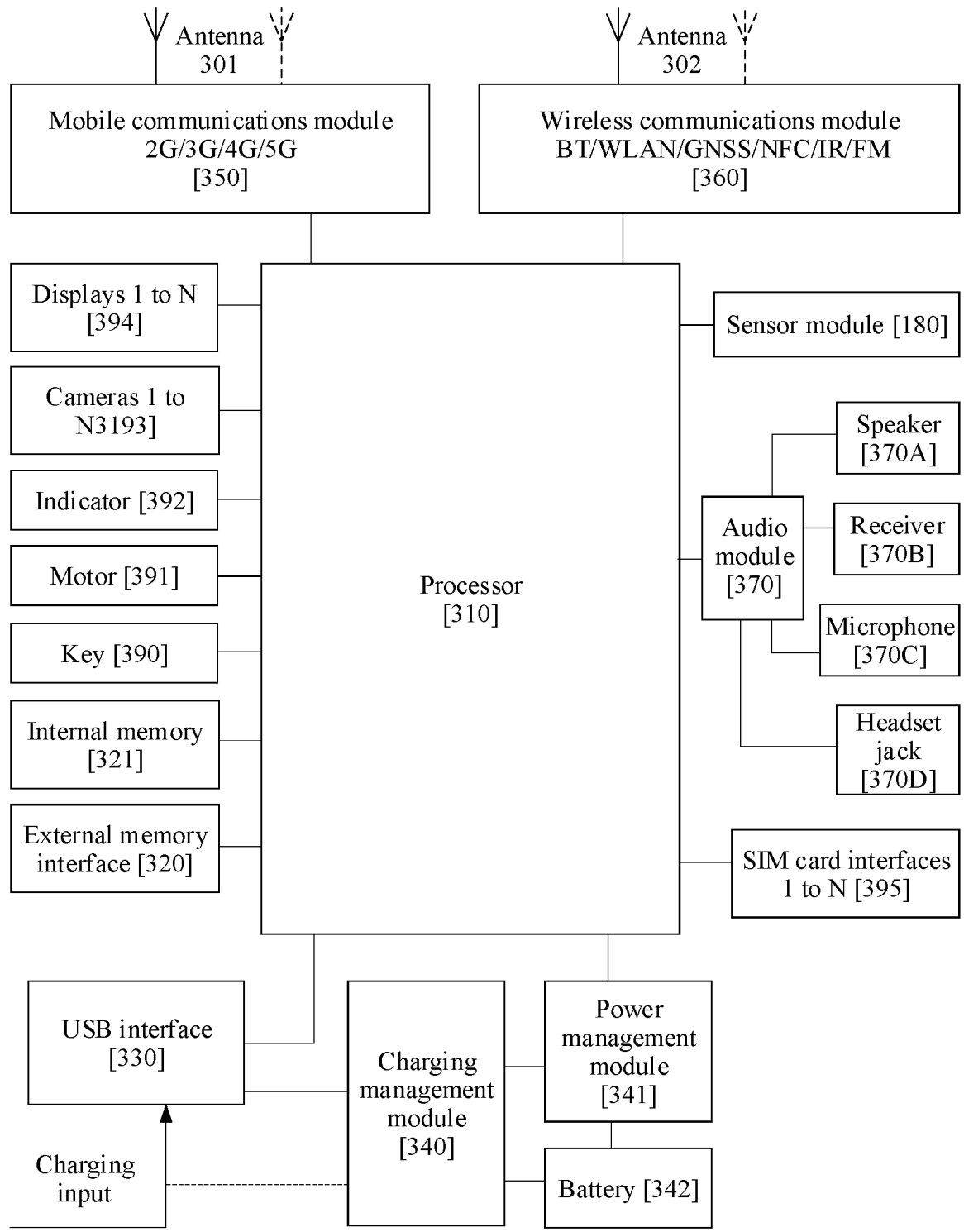
FIG. 3 is a schematic structural diagram of a mobile phone according to an embodiment of this application.

For example, the second electronic device is the mobile phone 300. FIG. 3 is a schematic structural diagram of the second electronic device. As shown in FIG. 3, the second electronic device may include a processor 310, an external memory interface 320, an internal memory 321, a USB interface 330, a charging management module 340, a power management module 341, a battery 342, an antenna 301, an antenna 302, a mobile communications module 350, a wireless communications module 360, an audio module 370, a speaker 370A, a receiver 370B, a microphone 370C, a headset jack 370D, a sensor module 380, a key 390, a motor 391, an indicator 392, a camera 393, a display 394, a SIM card interface 395, and the like. The sensor module may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that a structure shown in this embodiment of this application does not constitute a specific limitation on the second electronic device. In some other embodiments of this application, the second electronic device may include more or fewer components than those shown in the figure, or combine some components, or split some components, or have different component arrangements. The components shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a DSP, a baseband processor, and/or a neural-network processing unit (neural-network processing unit, NPU). Different processing units may be independent devices, or may be integrated into one or more processors.

The controller may be a nerve center and a command center of the second electronic device. The controller may generate an operation control signal based on instruction operation code and a time sequence signal, to complete control of instruction reading and instruction execution.

A memory may further be disposed in the processor 310, and is configured to store an instruction and data. In some embodiments, the memory in the processor 310 is a cache. The memory may store an instruction or data that is just used or cyclically used by the processor 310. If the processor 310 needs to use the instruction or the data again, the processor 310 may directly invoke the instruction or the data from the memory, to avoid repeated access and reduce a waiting time of the processor 310, thereby improving system efficiency.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, a USB interface, and/or the like.

The I2C interface is a two-way synchronization serial bus, and includes a serial data line (serial data line, SDA) and a serial clock line (serial clock line, SCL). The processor 310 may be separately coupled to the touch sensor, a charger, a flash, the camera 393, and the like through different I2C bus interfaces. The UART interface is a universal serial data bus, and is configured to perform asynchronous communication. The bus may be a two-way communications bus, and converts to-be-transmitted data between serial communication and parallel communication. The UART interface is usually configured to connect the processor 310 and the wireless communications module 360. For example, the processor 310 communicates with a WLAN (for example, a Wi-Fi network) in the wireless communications module 360 through the UART interface, to implement a Wi-Fi function. The MIPI interface may be configured to connect the processor 310 to a peripheral component such as the display 394 or the camera 393. The GPIO interface may be configured through software. The GPIO interface may be configured as a control signal or a data signal. The USB interface 330 is an interface that conforms to a USB standard specification, and may be specifically a mini USB interface, a micro USB interface, a USB Type C interface, or the like.

It may be understood that an interface connection relationship between the modules shown in this embodiment of the present invention is merely an example for description, and does not constitute a limitation on the structure of the second electronic device. In some other embodiments of this application, the second electronic device may alternatively use an interface connection manner different from that in the foregoing embodiment, or a combination of a plurality of interface connection manners.

The charging management module 340 is configured to receive a charging input from the charger. The charger may be a wireless charger or a wired charger. In some embodiments of wired charging, the charging management module 340 may receive a charging input of the wired charger through the USB interface 330. In some embodiments of wireless charging, the charging management module 340 may receive a wireless charging input through a wireless charging coil of the second electronic device. The charging management module 340 supplies power to the second electronic device through the power management module 341 while charging the battery 342.

The power management module 341 is configured to connect the battery 342 and the charging management module 340 to the processor 310. The power management module 341 receives an input of the battery 342 and/or the charging management module 340, and supplies power to the processor 310, the internal memory 321, an external memory, the display 394, the camera 393, the wireless communications module 360, and the like. The power management module 341 may further be configured to monitor parameters such as a battery capacity, a quantity of battery cycles, and a battery health status (electric leakage or impedance). In some other embodiments, the power management module 341 may alternatively be disposed in the processor 310. In some other embodiments, the power management module 341 and the charging management module 340 may alternatively be disposed in a same device.

A wireless communication function of the second electronic device may be implemented through the antenna 301, the antenna 302, the mobile communications module 350, the wireless communications module 160, the modem processor, the baseband processor, and the like.

The antenna 301 and the antenna 302 are configured to transmit and receive electromagnetic wave signals. Each antenna in the second electronic device may be configured to cover one or more communications frequency bands. Different antennas may further be multiplexed to improve antenna utilization. For example, the antenna 301 may be multiplexed as a diversity antenna in a wireless local area network. In some other embodiments, the antenna may be used in combination with a tuning switch.

The antenna 301 is coupled to the mobile communications module 350. The mobile communications module 350 may provide a solution that is for wireless communication including 2G/3G/4G/5G and the like and that is applied to the second electronic device. For detailed descriptions of the mobile communications module 350, refer to the descriptions of the mobile communications module 220 in the embodiments of this application. Details are not described herein again in this embodiment of this application.

The antenna 302 is coupled to the wireless communications module 360. The wireless communications module 360 may provide a solution that is for wireless communication including WLAN, BT, GNSS, FM, NFC, IR and the like and that is applied to the second electronic device. For detailed descriptions of the wireless communications module 360, refer to the descriptions of the wireless communications module 230 in the embodiments of this application. Details are not described herein again in this embodiment of this application.

The second electronic device implements a display function through the GPU, the display 394, the application processor, and the like. The GPU is a microprocessor for image processing, and connects the display 394 to the application processor. The GPU is configured to perform mathematical and geometric calculation, and render an image. The processor 310 may include one or more GPUs that execute a program instruction to generate or change display information.

The display 394 is configured to display an image, a video, and the like. The display 394 includes a display panel. An LCD, an OLED, an AMOLED, a FLED, a mini-LED, a micro-LED, a micro-OLED, QLED, or the like may be used for the display panel. For example, the second electronic device may include one or more displays 394.

In this embodiment of this application, the second electronic device may access a Wi-Fi network provided by the CPE 100. In some embodiments, the second electronic device may further display an evaluation result of the CPE 100 according to an instruction of the CPE 100.

The second electronic device may implement a photographing function through the ISP, the camera 393, the video codec, the GPU, the display 394, the application processor, and the like. The ISP is configured to process data fed back by the camera 393. The camera 393 is configured to capture a static image or a video. In some embodiments, the second electronic device may include one or N cameras 393, where N is a positive integer greater than 1.

The digital signal processor is configured to process a digital signal, and may process another digital signal in addition to the digital image signal. For example, when the second electronic device selects a frequency, the digital signal processor is configured to perform Fourier transform and the like on frequency energy. The video codec is configured to compress or decompress a digital video. The second electronic device may support one or more video codecs. In this way, the second electronic device can play or record videos in a plurality of encoding formats, for example, moving picture experts group (moving picture experts group, MPEG) 1, MPEG 2, MPEG 3, MPEG 4, and the like.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the second electronic device may be implemented through the NPU, for example, image recognition, facial recognition, speech recognition, and text understanding.

The external memory interface 320 may be configured to connect to an external storage card, for example, a micro SD card, to extend a storage capability of the second electronic device. The external storage card communicates with the processor 310 by using the external memory interface 320, to implement a data storage function. For example, music and videos are stored in the external storage card.

The internal memory 321 may be configured to store computer-executable program code. The executable program code includes an instruction. The processor 310 runs the instruction stored in the internal memory 321 to perform various function applications of the second electronic device and process data. The internal memory 321 may include a program storage area and a data storage area. The program storage area may store an operating system, an application required by at least one function (for example, a voice playing function or an image playing function), and the like. The data storage area may store data (such as audio data and an address book) created during use of the second electronic device, and the like. In addition, the internal memory 321 may include a high-speed random access memory, and may further include a nonvolatile memory, for example, at least one magnetic disk storage device, a flash memory device, or a universal flash storage (universal flash storage, UFS).

The second electronic device may implement an audio function, for example, music playing and recording, through the audio module 370, the speaker 370A, the receiver 370B, the microphone 370C, the headset jack 370D, the application processor, and the like. The audio module 370 is configured to convert digital audio information into an analog audio signal output, and is also configured to convert an analog audio input into a digital audio signal. The audio module 370 may further be configured to code and decode an audio signal. The speaker 370A, also referred to as a "horn", is configured to convert an audio electrical signal into a sound signal. The second electronic device may listen to music or answer a hands-free call through the speaker 370A. The receiver 370B, also referred to as an "earpiece", is configured to convert an audio electrical signal into a sound signal. When a call is answered or voice information is received by using the second electronic device, the receiver 370B may be put close to a human ear to receive a voice. The microphone 370C, also referred to as a "mike" or a "microphone", is configured to convert a sound signal into an electrical signal.

The headset jack 370D is configured to connect to a wired headset. The headset jack 170D may be the USB interface 330 or a 3.5 mm open mobile second electronic device platform (open mobile terminal platform, OMTP) standard interface or cellular telecommunications industry association of the USA (cellular telecommunications industry association of the USA, CTIA) standard interface.

The key 390 includes a power key, a volume key, and the like. The key 390 may be a mechanical key or a touch key. The second electronic device may receive a key input, and generate a key signal input related to a user setting and function control of the second electronic device.

The motor 391 may generate a vibration prompt. The indicator 192 may be an indicator light, and may be configured to indicate a charging status and a power change, or may be configured to indicate a message, a missed call, a notification, and the like.

For detailed descriptions of the SIM card interface 395, refer to the descriptions of the SIM card interface 240 of the CPE 100 in the embodiments of this application. Details are not described herein again in this embodiment of this application.

For ease of understanding, in the embodiments of this application, an example in which the first electronic device is the CPE 100 shown in FIG. 1, the second electronic device is the mobile phone 300 shown in FIG. 1, and the one or more wireless base stations include the 4G base station 110 and the 5G base station 120 is used, with reference to the accompanying drawings, to specifically describe the wireless signal quality evaluation method provided in the embodiments of this application.

Figure 4:
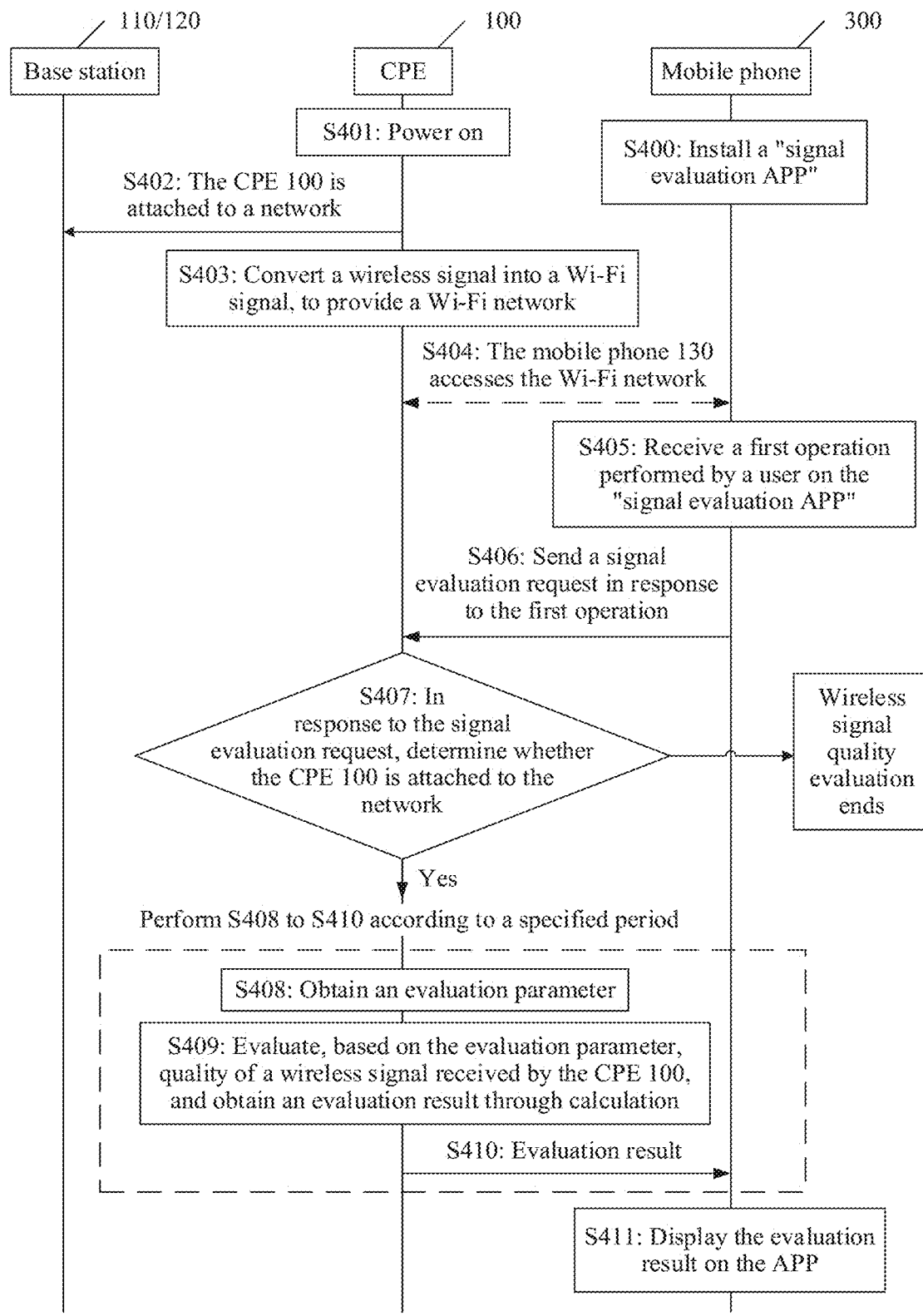
FIG. 4 is a flowchart of a wireless signal quality evaluation method according to an embodiment of this application.

As shown in FIG. 4, after the CPE 100 is powered on, the CPE 100 may request to be attached to a network from the 5G base station 110 and/or the 4G base station 120 (that is, S401 and S402 are performed). A scenario in which the CPE 100 is attached to a 5G network or a 4G network is referred to as a single connectivity scenario. A scenario in which the CPE 100 is attached to both a 5G network and a 4G network is referred to as a dual connectivity (namely, DC) scenario.

After being attached to the network (the 4G network and/or the 5G network), the CPE 100 may convert a wireless signal of the 4G network or the 5G network into a Wi-Fi signal, to provide a Wi-Fi network (that is, S403 is performed). Optionally, the mobile phone 300 may access the Wi-Fi network provided by the CPE 100 (that is, S404 is performed).

In some embodiments, the mobile phone 300 may display a wireless signal quality evaluation result (which is briefly referred to as an evaluation result) of the CPE 100. An APP used to control the CPE 100 to evaluate wireless signal quality may be installed in the mobile phone 300 (that is, S400 is performed). The APP may be referred to as a "signal evaluation APP". For example, a user may operate the mobile phone 300 to scan a QR code or a barcode provided on the CPE 100, and install the "signal evaluation APP". Alternatively, the user may operate the mobile phone 300 to search for the "signal evaluation APP" from an APP store and install the "signal evaluation APP".

The mobile phone 300 may receive a first operation performed by the user on the "signal evaluation APP" on the mobile phone 300 (that is, S405 is performed). In response to the first operation, the mobile phone 300 may send a signal evaluation request to the CPE 100 (that is, S406 is performed). The signal evaluation request is used to request the CPE 100 to evaluate wireless signal quality.

Figure 5:
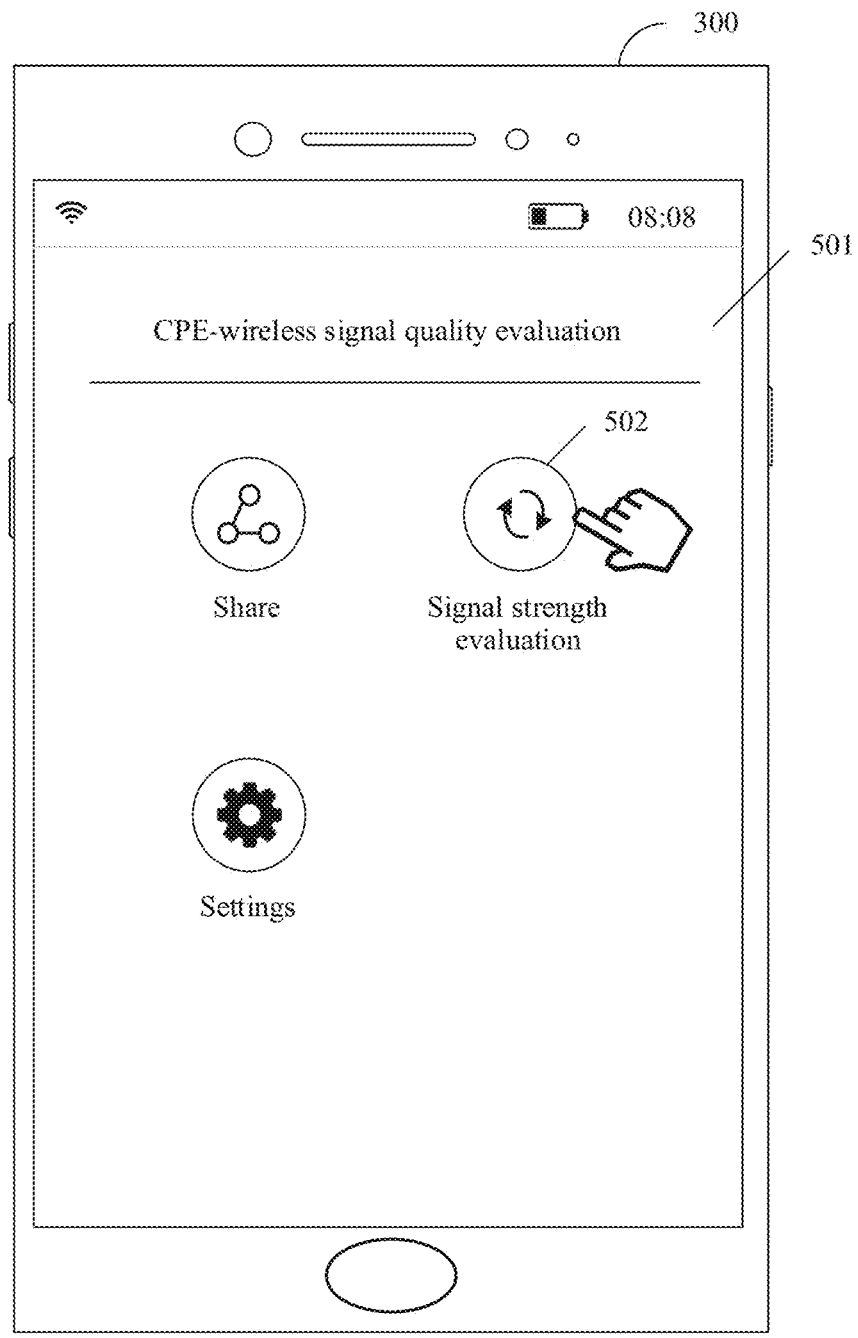
FIG. 5 is a schematic diagram of a display interface for evaluating wireless signal quality according to an embodiment of this application.

For example, after the "signal evaluation APP" is installed on the mobile phone 300, in response to a tap operation performed by the user on an application icon of the "signal evaluation APP", the mobile phone 100 may display a display interface 501 shown in FIG. 5. The display interface 501 includes a "signal strength evaluation" key 502. In response to a tap operation (for example, a click operation) performed by the user on the "signal strength evaluation" key 502, the mobile phone 300 may send a signal evaluation request to the CPE 100. The first operation may include the tap operation performed by the user on the "signal strength evaluation" key 502. Optionally, as shown in FIG. 5, the display interface 501 may further include a "share" key and a "settings" key. The "share" key is used to trigger the mobile phone 300 to share an evaluation result with another electronic device. The "settings" key is used to set a parameter related to the "signal evaluation APP", for example, a period in which the CPE 100 sends the evaluation result to the mobile phone 300.

In response to the signal evaluation request, the CPE 100 may start evaluation and send, to the mobile phone 300, a quality parameter of a wireless signal received by the CPE 100. Specifically, the method in the embodiments of this application may further include S407 to S409. In response to the signal evaluation request, the CPE 100 determines whether the CPE 100 is attached to the network (that is, S407 is performed).

If the CPE 100 is not attached to the network, wireless signal quality evaluation ends. That the CPE 100 is not attached to the network indicates that the CPE 100 is not attached to any one of the 4G network, the 5G network, or another network. Optionally, if the CPE 100 is not attached to the network, the CPE 100 may send, to the mobile phone 300, an indication message indicating that no wireless network is attached. In response to the indication message, the mobile phone 300 may send prompt information. The prompt information is used to indicate that the CPE 100 is not attached to the network or the CPE 100 fails to be connected to the network. For example, the mobile phone 300 may display a pop-up window including the prompt information.

If the CPE 100 is attached to the network, the CPE 100 may receive a wireless signal sent by a wireless base station. However, affected by factors such as a building layout, quality of wireless signals received by the CPE 100 at different times or at different locations is different. The CPE 100 may be located at different locations at the different times. To select an ideal location for placing the CPE 100, namely, a location at which quality of a wireless signal received by the CPE 100 is relatively high, the user may change a location of the CPE 100, so that the CPE 100 can evaluate quality parameters of the wireless signals received by the CPE 100 at different locations.

There are the following two cases in which the CPE 100 is attached to the network: (1) The CPE 100 is attached to any one of the 4G network, the 5G network, or the like; or (2) the CPE 100 is attached to both the 4G network and the 5G network.

In some embodiments, if the CPE 100 is attached to the network, the CPE 100 may perform the following steps according to a specified period: obtaining an evaluation parameter (that is, S408 is performed); evaluating, based on the evaluation parameter, quality of the wireless signal received by the CPE 100, to obtain an evaluation result through calculation (that is. S409 is performed); and sending the evaluation result to the mobile phone 300 (that is, S410 is performed).

The evaluation parameter may include at least two of a strength parameter (for example, RSRP) of a wireless signal received by the CPE 100 at a collection time, an interference parameter (for example, an SINR) of the wireless signal received by the CPE 100 at the collection time, a standard parameter of a network corresponding to the wireless signal received by the CPE 100 at the collection time, a quantity of access paths (for example, a RANK) of the wireless signal received by the CPE 100 at the collection time, and a CQI of the wireless signal received by the CPE 100 at the collection time.

For example, the evaluation parameter may include the standard parameter, the RSRP, and the SINR. For another example, the evaluation parameter may include the RSRP, the SINR, the standard parameter, the RANK, and the CQI.

The standard parameter is used to indicate a network standard of the wireless signal received by the CPE 100 at the collection time. In other words, the standard parameter is used to indicate a network standard of a network to which the CPE 100 is attached at the collection time. The standard parameter of the network to which the CPE 100 is attached may be sent by the wireless base station to the CPE 100. The CPE 100 may pre-store a standard parameter of a network in each standard.

It may be understood that, on a premise that other parameters than the standard parameter in the evaluation parameter are the same, quality of a wireless signal received by the CPE 100 in the 5G network is higher than quality of a wireless signal received by the CPE 100 in the 4G network, and the quality of the wireless signal received by the CPE 100 in the 4G network is higher than quality of a wireless signal received by the CPE 100 in a 3G network. Therefore, in this case, a first choice for placing the CPE 100 may be a location at which the 5G network can be accessed, a second choice for placing the CPE 100 is a location at which the 4G network can be accessed, and a last choice for placing the CPE 100 is a location at which the 4G network can be accessed.

In this embodiment of this application, the standard parameter of the network in each standard may be set to: a standard parameter of the 5G network>a standard parameter of the 4G network>a standard parameter of the 3G network. For example, a standard parameter $C_{5G}$ of the 5G network is 5, a standard parameter $C_{4G}$ of the 4G network is 3, and a standard parameter $C_{3G}$ of the 3G network is 1.

The RSRP and the SINR may be referred to as idle (idle)-state parameters. Regardless of whether service data is transmitted between the CPE 100 and a wireless base station (for example, the 5G base station 110) accessed by the CPE 100, the CPE 100 may obtain the RSRP and the SINR of the CPE 100.

It may be understood that, on a premise that other parameters than the RSRP in the evaluation parameter are the same, a larger RSRP of a wireless signal indicates higher strength of the wireless signal received by the CPE 100. In this case, the CPE 100 may be preferentially placed at a location at which RSRP of a received wireless signal is relatively large.

On a premise that other parameters than the SINR in the evaluation parameter are the same, a larger SINR of a wireless signal indicates less interference to the CPE 100, and a smaller SINR of a wireless signal indicates greater interference to the CPE 100. In this case, the CPE 100 may be preferentially placed at a location with less interference of a wireless signal (namely, a location with a relatively large SINR).

The RANK and the CQI may be referred to as running-state parameters. The CPE 100 can collect the running-state parameters only when the service data is transmitted between the CPE 100 and the wireless base station (for example, the 5G base station 110) accessed by the CPE 100. If the service data is being transmitted between the CPE 100 and the wireless base station accessed by the CPE 100, the CPE 100 may directly collect the running-state parameters. If no service data is currently transmitted between the CPE 100 and the wireless base station accessed by the CPE 100, the CPE 100 may send a service request to the wireless base station accessed by the CPE 100. For example, the service request may be a heartbeat packet. In this way, service data is transmitted between the CPE 100 and the wireless base station, and the CPE 100 can obtain the RANK and the CQI.

It may be understood that, on a premise that other parameters than the RANK in the evaluation parameter are the same, a larger RANK indicates a larger quantity of data paths that can be accessed by the CPE 100 and more resources that can be used by the CPE 100 for wireless communication. In this case, the CPE 100 may be preferentially placed at a location at which a RANK of a received wireless signal is relatively large.

On a premise that other parameters than the CQI in the evaluation parameter are the same, a larger CQI indicates higher quality of a channel for receiving a wireless signal by the CPE 100. In this case, the CPE 100 may be preferentially placed at a location at which a CQI of a received wireless signal is relatively large.

That the CPE 100 evaluates, based on the evaluation parameter, the quality of the wireless signal received by the CPE 100, and obtains the evaluation result through calculation (that is. S409 is performed) may include: The CPE 100 calculates, by using a specified weighted fitting algorithm based on the evaluation parameter, the quality parameter of the wireless signal received by the CPE 100. The quality parameter of the wireless signal is used to represent the quality of the wireless signal of the CPE 100.

For example, when the evaluation parameter includes the standard parameter, the RSRP, and the SINR, the weighted fitting algorithm may be $K=A_{RSPR} \times a - B_{SINR} \times b + C \times c$. K is the quality parameter of the wireless signal of the CPE 10. $A_{RSPR}$ is used to represent a value of the RSRP of the CPE 100, and a is a weighted value of the RSRP. $B_{SINR}$ is used to represent a value of the SINR of the CPE 100, and b is a weighted value of the SINR. C is the standard parameter of the network to which the CPE 100 is attached, and c is a weighted value of the standard parameter.

When the evaluation parameter includes the RSRP, the SINR, the standard parameter, the RANK, and the CQI, the weighted fitting algorithm may be $K=A_{RSPR} \times a - B_{SINR} \times b + C \times c + D_{RANK} \times d + E_{CQI} \times e$. K is the quality parameter of the wireless signal of the CPE 100. $A_{RSPR}$ is used to represent a value of the RSRP of the CPE 100, and a is a weighted value of the RSRP. $B_{SINR}$ is used to represent a value of the SINR of the CPE 100, and b is a weighted value of the SINR. C is the standard parameter of the network to which the CPE 100 is attached, and c is a weighted value of the standard parameter. $D_{RANK}$ is used to represent a value of the RANK, and d is a weighted value of the RANK. $E_{CQI}$ is used to represent a value of the CQI, and e is a weighted value of the CQI.

In this embodiment of this application, the weighted fitting algorithm, the standard parameter of each network, and the weighted value of each parameter may be sent by the wireless base station to the CPE 100. The CPE 100 may receive and store the weighted fitting algorithm, the standard parameter, and the weighted value.

The wireless base station may perform a large quantity of tests, and determine the weighted fitting algorithm, the standard parameter, and the weighted value based on a degree of impact of each parameter on wireless signal quality. Optionally, the wireless base station may periodically update the weighted fitting algorithm, the weighted value, and the standard parameter, and send an updated weighted fitting algorithm, an updated weighted value, and an updated standard parameter to the CPE 100. The CPE 100 evaluates the wireless signal quality based on the updated weighted fitting algorithm, the updated weighted value, and the updated standard parameter, so that accuracy of the evaluation result obtained by the CPE 100 through calculation can be improved.

It should be noted that the quality of the wireless signal of the CPE 100 is affected by the foregoing plurality of parameters. Each parameter has different impact on the wireless signal quality. Therefore, the weighted value of each parameter is different. For example, the standard parameter, the RSRP, and the SINR have relatively great impact on the wireless signal quality. Therefore, the weighted values of the standard parameter, the RSRP, and the SINR are relatively large. Among the standard parameter, the RSRP, and the SINR, the standard parameter has the greatest impact on the wireless signal quality. Therefore, the weighted value of the standard parameter is greater than the weighted values of the RSRP and the SINR. Between the RSRP and the SINR, the RSRP has greater impact on the wireless signal quality. Therefore, the weighted value of the RSRP is greater than the weighted value of the SINR. Other parameters have relatively small impact on the wireless signal quality. Therefore, weighted values of the other parameters are relatively small.

In some embodiments, considering that in networks in different standards, value ranges of the RSRP, the SINR, the RANK, or the CQI may be different, to use a unified standard to measure wireless signal quality when the CPE 100 is attached to the networks in different standards, the CPE 100 may convert all the foregoing parameters into values in a value range of 1 to N. For example, N=12, or N=10. In this embodiment, $A_{RSPR}$ is a value obtained after RSRP conversion, $B_{SINR}$ is a value obtained after SINR conversion, $D_{RANK}$ is a value obtained after RANK conversion, and $E_{CQI}$ is a value obtained after CQI conversion. A value range of each of $A_{RSPR}$, $B_{SINR}$, $D_{RANK}$, and $E_{CQI}$ is 1 to N. In addition, $A_{RSPR}$, $B_{SNR}$, $D_{RANK}$, and $E_{CQI}$ are all positive integers. In this embodiment of this application, an example in which the CPE 100 converts the SINR into $B_{SINR}$ is used herein to describe a method in which the CPE 100 converts all the foregoing parameters into the values in the value range of 1 to N. In the 4G network, a value range of the SINR is 0 to 30. It is assumed that N=12 and SINR=20. In this case, $B_{SINR}=(20/30) \times 12=8$.

In some embodiments, to ensure that a value range of the quality parameter K of the wireless signal is also 1 to N, a sum of the weighted values of the foregoing plurality of parameters is 1, that is, a+b+c+d+e=1. K is a positive integer. For example, the weighted value a of the RSRP is 26%, the weighted value b of the SINR is 24%, the weighted value c of the standard parameter is 30%, the weighted value d of the RANK is 10%, and the weighted value e of the CQI is 10%.

It may be understood that the value range of the quality parameter K of the wireless signal obtained through calculation based on the foregoing evaluation parameter is also 1 to N, and K is a positive integer. If $A_{RSPR}$, $B_{SINR}$, $D_{RANK}$, $E_{CQI}$, or K obtained through calculation by the CPE 100 is not a positive integer, $A_{RSPR}$, $B_{SINR}$, $D_{RANK}$, $E_{CQI}$, or K may be rounded off to a positive integer.

It should be noted that, in the single connectivity scenario, the CPE 100 only needs to calculate, by using the foregoing specified weighted fitting algorithm, a quality parameter K of a wireless signal when the CPE is attached to a network (for example, the 5G network). However, in the DC scenario, the CPE 100 is attached to both the 5G network and the 4G network.

In the DC scenario, the CPE 100 may separately obtain an evaluation parameter (namely, an evaluation parameter of a first wireless signal, such as $A_{RSPR4G}$, $B_{SINR-4G}$, $C_{4G}$, $D_{RANK-4G}$, and $E_{CQI-4G}$) in the 4G network and an evaluation parameter (namely, an evaluation parameter of a second wireless signal, such as $A_{RSPR-5G}$, $B_{SINR-5G}$, $C_{5G}$, $D_{RANK-5G}$, and $E_{CQI-5G}$) in the 5G network. Then, the CPE 100 calculates a quality parameter $K_{4G}$ of the wireless signal of the CPE 100 in the 4G network based on $A_{RSPR-4G}$, $B_{SINR-4G}$, $C_{4G}$, $D_{RANK-4G}$, and $E_{CQI-4G}$, and calculates a quality parameter $K_{5G}$ of the wireless signal of the CPE 100 in the 5G network based on $A_{RSPR-5G}$, $B_{SINR-5G}$, $C_{5G}$, $D_{RANK-5G}$, and $E_{CQI-5G}$.

In this embodiment of this application, the CPE 100 may calculate, based on at least two of the plurality of parameters such as the RSRP, the SINR, the RANK, and the CQI, the quality parameter of the wireless signal of the CPE 100. In this way, accuracy of evaluating the wireless signal quality by the CPE 100 can be improved.

After S408 to S409, the CPE 100 may send the evaluation result to the mobile phone 300 (that is, S410 is performed). The evaluation result includes the quality parameter of the wireless signal received by the CPE 100 at the collection time and information about the collection time. After receiving the evaluation result, the mobile phone 300 may present the evaluation result in a specified manner on the "signal evaluation APP" (that is, S411 is performed).

For example, the mobile phone 300 and the CPE 100 may transmit the signal evaluation request and the evaluation result through a mobile communications network. The "signal evaluation APP" is installed on the mobile phone 300. The mobile phone 300 may send, through the mobile communications network, a signal evaluation request to a cloud server that manages the "signal evaluation APP". The cloud server forwards the signal evaluation request to the CPE 100 through the mobile communications network. The CPE 100 sends an evaluation result to the cloud server through the mobile communications network. The cloud server forwards the evaluation result to the mobile phone 300 through mobile communications network.

Alternatively, the mobile phone 300 and the CPE 100 may transmit the signal evaluation request and the evaluation result through a wireless short-range connection (such as a Bluetooth connection, a Wi-Fi connection, or an NFC connection) between the mobile phone 300 and the CPE 100.

In the single connectivity scenario, the evaluation result includes the quality parameter K of the wireless signal when the CPE 100 is attached to the network (for example, the 5G network). The evaluation result presented on the "signal evaluation APP" of the mobile phone 300 includes K. For example, the mobile phone 300 may display a first interface 503 shown in FIG. 5A. The first interface 503 includes a column 504. A height (or a height and a color depth) of the column 504 may represent a value of a quality parameter K of a wireless signal received by the CPE 100 at a current time. A higher column 504 (or a higher column 504 and a deeper color) indicates a larger quality parameter K of a wireless signal received by the CPE 100 when the CPE 100 is attached to the 5G network. The foregoing setting manner includes but is not limited to a manner of a bar chart.

Figure 5A:
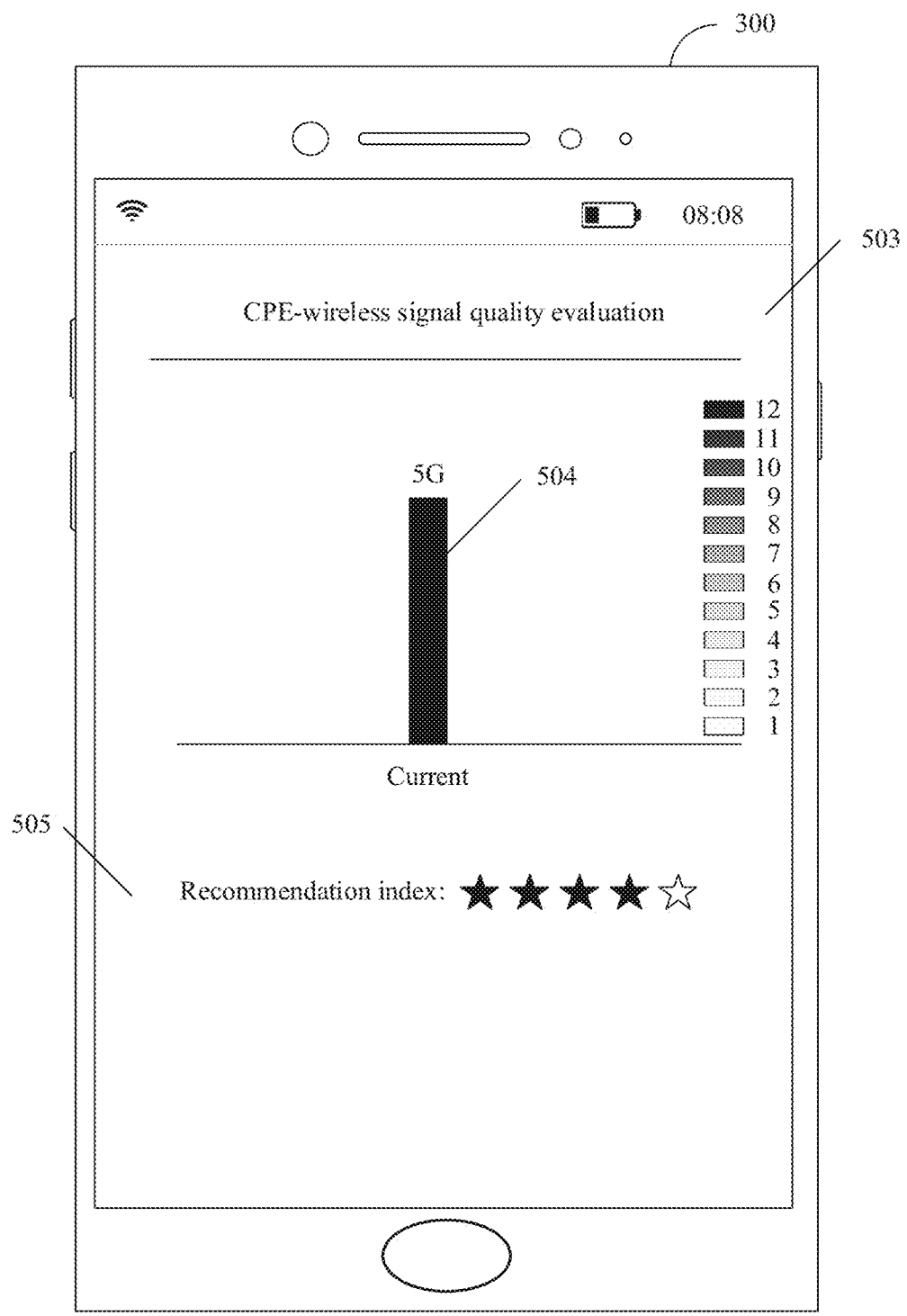
FIG. 5A is a schematic diagram of another display interface for evaluating wireless signal quality according to an embodiment of this application.
Figure 5B:
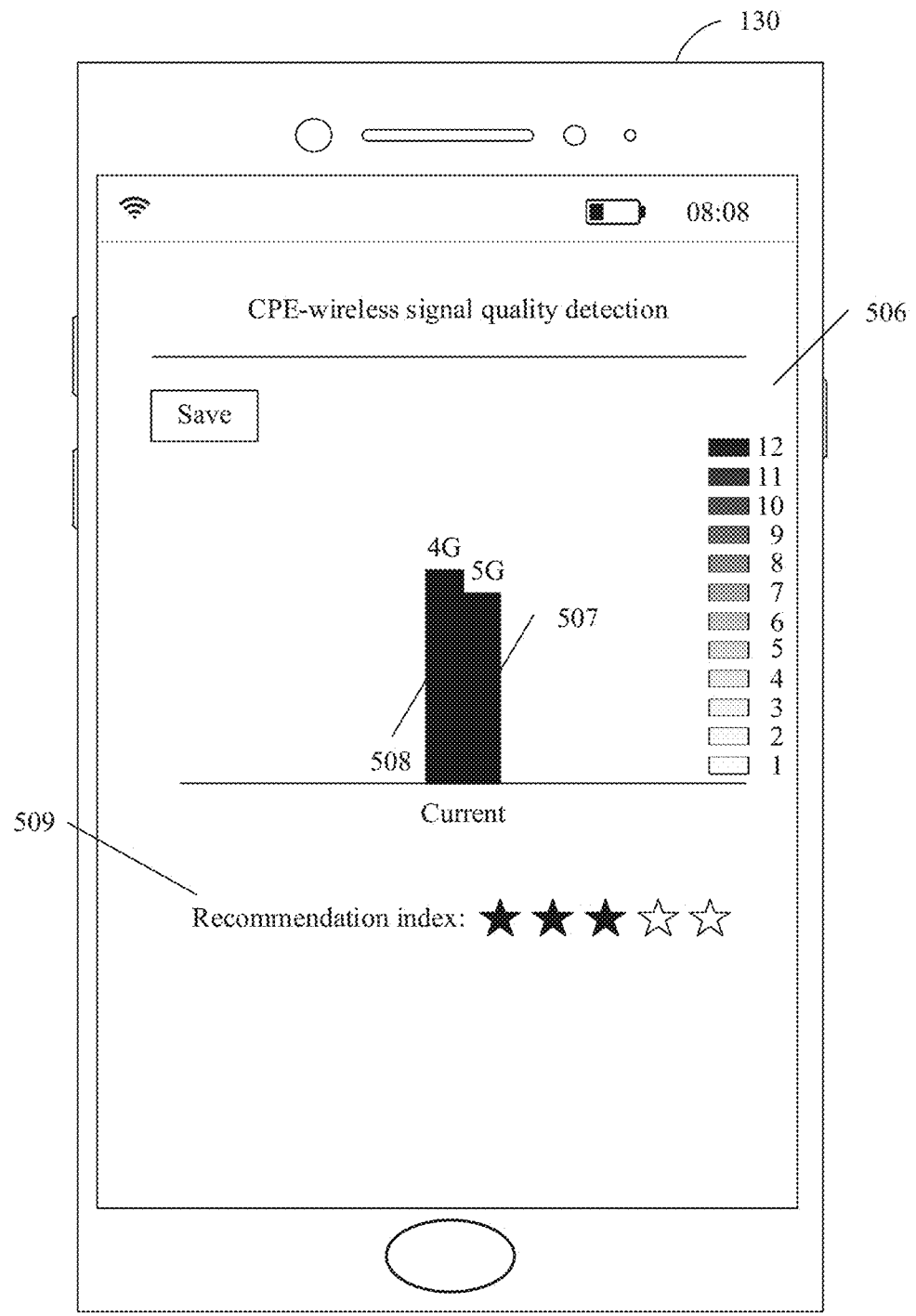
FIG. 5B is a schematic diagram of another display interface for evaluating wireless signal quality according to an embodiment of this application.

In the DC scenario, the quality parameter of the wireless signal received by the CPE 100 at the collection time includes the quality parameter $K_{5G}$ of the first wireless signal (for example, a 5G signal) received by the CPE 100 at the collection time and the quality parameter $K_{4G}$ of the second wireless signal ($K_{4G}$) received by the CPE 100 at the collection time. In other words, the evaluation result includes $K_{4G}$ and $K_{5G}$. The evaluation result presented on the "signal evaluation APP" of the mobile phone 300 include $K_{4G}$ and $K_{5G}$. For example, as shown in FIG. 5B, a first interface 506 displayed by the mobile phone 300 includes a column 507 and a column 508. A height of the column 507 may represent a size of $K_{4G}$. A higher column 507 indicates larger $K_{4G}$. A height of the column 508 may represent a size of $K_{5G}$. A higher column 508 indicates larger $K_{5G}$.

Optionally, the evaluation result may further include a recommendation index of the wireless signal received by the CPE 100 at the collection time. The recommendation index may represent quality of the wireless signal received by the CPE 100 at the collection time. A higher recommendation index indicates higher quality of the wireless signal received by the CPE 100 at the collection time. A value range of the recommendation index may be 1 to M, and the recommendation index is a positive integer. For example, M=5, or M=6.

In the single connectivity scenario, the CPE 100 may calculate, based on K, N, and M, the recommendation index of the wireless signal received by the CPE 100 at the collection time. For example, the value range of the recommendation index may be 1 to 5 (that is, M=5). As shown in FIG. 5A, a recommendation index 505 on the first interface 503 is up to five stars, that is, a highest value of the recommendation index 505 is equal to 5. It is assumed that the value range of K is 1 to 12 (that is, N=12). When K=9, the recommendation index of the wireless signal received by the CPE 104) at the collection time=(9/12)×5=4. As shown in FIG. 5A, the recommendation index 505 is four stars, that is, the recommendation index 505 is equal to 4.

In the DC scenario, the CPE 100 may search a specified recommendation index table for recommendation indexes corresponding to $K_{4G}$ and $K_{5G}$. The recommendation index found by the CPE 100 is the recommendation index of the wireless signal received by the CPE 100 at the collection time. For example, Table 1 shows an example of are commendation index table provided in this embodiment of this application.

TABLE 1

| $K_{5G}$ | $K_{4G}$ | | | | | Recommendation index | | | | | | |
|---|---|---|---|---|---|---|---|---|---|---|---|---|
| | 0 | 1 | 2 | 3 | 4 | 5 | 6 | 7 | 8 | 9 | 10 | 11 | 12 |
| Recom- 1 | 0 | 0 | 1 | 2 | 2 | 3 | 3 | 4 | 4 | 4 | 5 | 5 |
| men- 2 | 0 | 0 | 1 | 2 | 2 | 3 | 3 | 4 | 4 | 4 | 5 | 5 |
| dation 3 | 1 | 1 | 1 | 2 | 2 | 3 | 3 | 4 | 4 | 4 | 5 | 5 |
| index 4 | 1 | 1 | 1 | 2 | 2 | 3 | 3 | 4 | 4 | 4 | 5 | 5 |
| 5 | 1 | 1 | 2 | 2 | 2 | 3 | 3 | 4 | 4 | 4 | 5 | 5 |
| 6 | 2 | 2 | 2 | 2 | 3 | 3 | 3 | 4 | 4 | 4 | 5 | 5 |
| 7 | 2 | 2 | 2 | 2 | 3 | 3 | 3 | 4 | 4 | 5 | 5 | 5 |
| 8 | 3 | 3 | 3 | 3 | 3 | 3 | 3 | 4 | 4 | 5 | 5 | 5 |
| 9 | 3 | 3 | 3 | 3 | 3 | 3 | 3 | 4 | 4 | 5 | 5 | 5 |
| 10 | 3 | 3 | 3 | 3 | 3 | 3 | 4 | 4 | 4 | 5 | 5 | 5 |
| 11 | 4 | 4 | 4 | 4 | 4 | 4 | 4 | 4 | 4 | 5 | 5 | 5 |
| 12 | 4 | 4 | 4 | 4 | 4 | 4 | 4 | 4 | 4 | 5 | 5 | 5 |

As shown in Table 1, the recommendation index ranges from 0 to 5. For example, when a quality parameter $K_{5G}$ of a 4G signal received by the CPE 100 at a collection time is 0, and a quality parameter $K_{5G}$ of a 5G signal received by the CPE 100 at the collection time is 0, a recommendation index of the wireless signal received by the CPE 100 at the collection time is 0. When a quality parameter K (namely, 4G-K) of a 4G signal received by the CPE 100 at a collection time is 7, and a quality parameter K (namely, 5G-K) of a 5G signal received by the CPE 100 at the collection time is 5, a recommendation index of the wireless signal received by the CPE 100 at the collection time is 3. When a quality parameter K (namely, 4G-K) of a 4G signal received by the CPE 100 at a collection time is 10, and a quality parameter K (namely, 5G-K) of a 5G signal received by the CPE 100 at the collection time is 11, a recommendation index of the wireless signal received by the CPE 100 at the collection time is 5.

For example, as shown in FIG. 5B, a quality parameter $K_{4G}$ of a wireless signal corresponding to a column 507 is equal to 8, and a quality parameter K-G of a wireless signal corresponding to a column 508 is equal to 7. The CPE 100 may find, from Table 1, a recommendation index 3 corresponding to $K_{4G}$ (for example, $K_{4G}$=8) and $K_{5G}$ (for example, $K_{5G}$=7). As shown in FIG. 5B, a recommendation index 509 is three stars, that is, the recommendation index 509 is equal to 3.

It may be understood that a recommendation index of a wireless signal received by the CPE 100 at a collection time may more intuitively indicate to the user a possibility of obtaining a wireless signal with relatively high quality by the CPE 100 if the CPE 100 is placed at a location corresponding to the collection time.

Optionally, in this embodiment of this application, the mobile phone 300 or the CPE 100 may further send an alarm indication when the recommendation index is less than a specified index threshold. The alarm indication is used to prompt the user to change a location of the CPE 100. The specified index threshold is a positive integer greater than 0 and less than M. For example, when M=5, the specified index threshold may be 2 or 3. For example, the alarm indication may be a voice alarm indication. Alternatively, the mobile phone 300 may display a reminder message including the alarm indication (for example, signal quality at this location is relatively poor, please move the CPE!).

It should be noted that, in this embodiment of this application, the mobile phone 300 may alternatively calculate the recommendation index. A method for calculating the recommendation index by the mobile phone 300 is the same as a method for calculating the recommendation index by the CPE 100. Details are not described herein in this embodiment of this application.

Optionally, the evaluation result may further include the standard parameter of the network to which the CPE 100 is attached. For example, as shown in FIG. 5A, a standard parameter 5G is marked on the column 504. The standard parameter 5G indicates that the column 504 is used to represent a value of the quality parameter of the wireless signal received by the CPE 100 in the 5G network. For example, as shown in FIG. 5B, a standard parameter 5G is marked on the column 507. The standard parameter 5G indicates that the column 507 is used to represent a value of the quality parameter of the wireless signal received by the CPE 100 in the 5G network. As shown in FIG. 5B, a standard parameter 4G is marked on the column 508. The standard parameter 4G indicates that the column 508 is used to represent a value of the quality parameter of the wireless signal received by the CPE 100 in the 4G network.

It should be noted that the quality of the wireless signal received by the CPE 100 may change with time. In this embodiment of this application, the CPE 100 may obtain and send the evaluation result to the mobile phone 300 according to a specified period (that is, S408 to S410 are performed). Correspondingly, each time the mobile phone 300 receives the evaluation result sent by the CPE 100, the mobile phone 300 may present a latest received evaluation result on the "signal evaluation APP".

The specified period may be set by the user on the "signal evaluation APP". For example, the user may set the specified period by using the "settings" key on the display interface 501 shown in FIG. 5. Then, the mobile phone 300 may notify the CPE 100 of the specified period. For example, the specified period may be 10 seconds (s), 5 s, 3 s, 2 s, or the like.

Figure 5C:
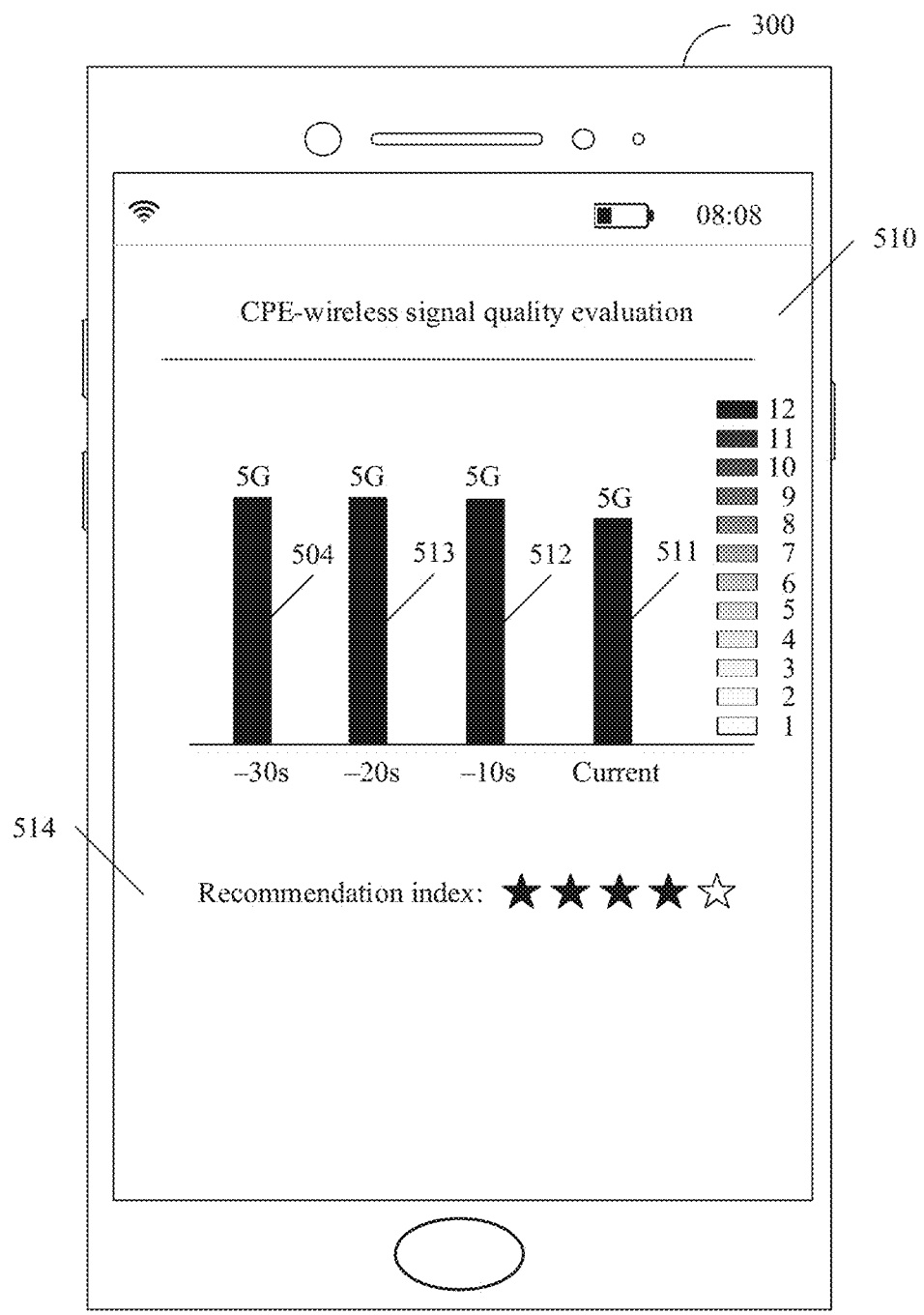
FIG. 5C is a schematic diagram of another display interface for evaluating wireless signal quality according to an embodiment of this application.

For example, the specified period is 10 s, and with reference to the first interface 503 shown in FIG. 5A, the CPE 100 sends an evaluation result to the mobile phone 300 every 10 seconds. For example, 10 s after the mobile phone 300 displays the first interface 503 shown in FIG. 5A, the mobile phone 300 may display a first interface 510 shown in FIG. 5C. The first interface 510 includes the column 504, a column 511, a column 512, and a column 513. The height of the column 504 may represent a value of a quality parameter K of a wireless signal received by the CPE 100 30 s before (namely, −30 s). A height of the column 513 may represent a value of a quality parameter K of a wireless signal received by the CPE 100 20 s before (namely, −20 s). A height of the column 512 may represent a value of a quality parameter K of a wireless signal received by the CPE 100 10 s before (namely, −10 s). A height of the column 511 may represent a value of a quality parameter K of a wireless signal currently received by the CPE 100.

In other words, in this embodiment of this application, the mobile phone 300 may not only display a quality parameter of a wireless signal received by the CPE 100 at the current collection time, but also display a quality parameter of a wireless signal received by the CPE 100 at a previous collection time.

Optionally, the first interface 510 may further include a recommendation index 514 of the wireless signal currently received by the CPE 100. For example, the recommendation index 514 is four stars, that is, the recommendation index 514 is equal to 4. It should be noted that, to improve stability of the recommendation index, the CPE 100 or the mobile phone 300 may calculate an average value of recommendation indexes at X collection times when the CPE 100 is at a same location. Then, the mobile phone 300 displays the average value as a final recommendation index. X≥1. For example, X=2, X=3, or X=4. X=4 is used as an example. The recommendation index 514 on the first interface 510 shown in FIG. 5C may be an average value of a recommendation index at −30 s, a recommendation index at −10 s, a recommendation index at −20 s, and a recommendation index at the current collection time.

In some embodiments, if the CPE 100 is attached to the network, the CPE 100 may further send a load request to the wireless base station accessed by the CPE 100. The load request is used to obtain, from the wireless base station, load evaluation information of a cell in which the CPE 100 is located. The load evaluation information of the cell represents a load status, at the collection time, of the cell accessed by the CPE 100.

In an implementation, the load evaluation information may be a load evaluation value of the cell in which the CPE 100 is located. The wireless base station may determine the load evaluation value based on a quantity of users in the cell and a throughput of the cell. In another implementation, the load evaluation information may include the quantity of users and the throughput. The CPE 100 may determine, based on the quantity of users and the throughput, the load evaluation value of the cell in which the CPE 100 is located.

A value range of the load evaluation value may be 1 to P, and P is a positive integer. For example, P=10, or P=12. A larger load evaluation value indicates a heavier load of the cell in which the CPE 100 is located. The wireless base station or the CPE 100 may store a correspondence between the load evaluation value and the quantity of users and the throughput. After obtaining the quantity of users and the throughput, the wireless base station or the CPE 100 may determine, based on the foregoing correspondence, the load evaluation value corresponding to the quantity of users and the throughput.

Generally, the wireless base station does not send load evaluation information of the wireless base station to the CPE 100. However, in this embodiment of this application, the CPE 100 may send the load request to the wireless base station through a private interface between the CPE 100 and the wireless base station. If the wireless base station is configured with the private interface, in response to the load request received by the private interface, the wireless base station may obtain the load evaluation information of the cell in which the CPE 100 is located, and send the load evaluation information to the CPE 100. If the wireless base station is not configured with the private interface, the wireless base station does not respond to the load request.

In this embodiment of this application, starting from a moment at which the CPE 100 sends the load request to the wireless base station, if the CPE 100 receives, within a specified time period, the load evaluation information sent by the wireless base station, the CPE 100 may send the load evaluation value to the mobile phone 300. The mobile phone 300 may present the load evaluation value on the "signal evaluation APP".

Figure 6:
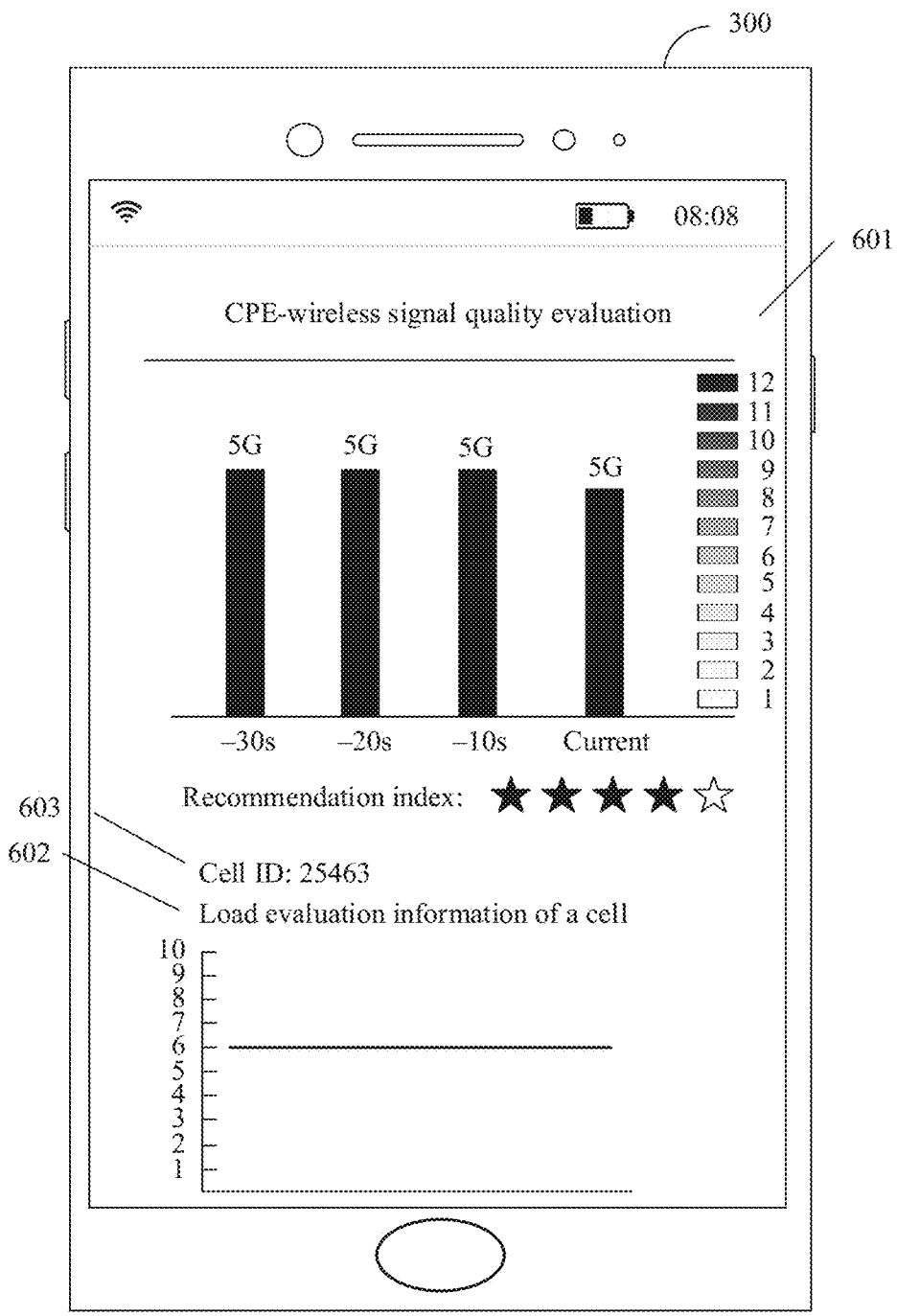
FIG. 6 is a schematic diagram of another display interface for evaluating wireless signal quality according to an embodiment of this application.

For example, as shown in FIG. 6, an example in which the value range of the load evaluation value is 1 to 10 (that is, P=10) is used. A first interface 601 displayed by the mobile phone 300 includes load evaluation information 602 about the cell. The load evaluation information 602 about the cell includes the load evaluation value of the cell accessed by the CPE 100. For example, the load evaluation value is 6. If the CPE 100 does not receive, within the specified time period, the load evaluation information sent by the wireless base station, it indicates that the wireless base station is not configured with the private interface. The CPE 100 cannot obtain the load evaluation value of the cell in which the CPE 100 is located. In this case, the mobile phone 300 does not display the load evaluation value. For example, the first interface 510 shown in FIG. 5C does not include the load evaluation information 602 about the cell shown in FIG. 6. Optionally, the first interface 601 may further include a cell ID 603 of a cell accessed by the CPE 100 at the current collection time. For example, the cell ID 603 may be 25463.

In some embodiments, the load evaluation value presented by the mobile phone 300 may be an average value of load evaluation values that are of the cell in which the CPE 100 is located and that are at X collection times. X≥1. For example, X=2, X=3, or X=4.

X=4 is used as an example. The load evaluation information 602 (namely, the load evaluation value) about the cell on the first interface 601 shown in FIG. 6 may be an average value of a load evaluation value at −30 s, a load evaluation value at −10 s, a load evaluation value at −20 s, and a load evaluation value at the current collection time.

It should be noted that, in the DC scenario, the CPE 100 may separately obtain a load evaluation value of a 4G cell accessed by the CPE 100 and a load evaluation value of a 5G cell accessed by the CPE 1M. Then, an average value of the load evaluation value of the 4G cell accessed by the CPE 100 and the load evaluation value of the 5G cell accessed by the CPE 100 is calculated. The average value can be used as the load evaluation value of the cell accessed by the CPE 100.

In this embodiment of this application, not only quality parameters of wireless signals received by the CPE 100 at a plurality of collection times but also the load evaluation value of the cell accessed by the CPE 100 may be presented to the user. In this way, the user may select, with reference to the quality parameter of the wireless signal of the CPE 100 and the load evaluation value of the accessed cell, a location with relatively high wireless signal quality and relatively low load to place the CPE 100.

In some embodiments, if the CPE 100 is attached to the network, the CPE 100 may further obtain location information corresponding to the CPE 100 at the collection time. The CPE 100 may obtain, according to the specified period, location information corresponding to each collection time. For example, the location information may be a location parameter (for example, longitude and latitude) obtained by the CPE 100 through positioning by using a positioning system (for example, a global positioning system (global positioning system, GPS)). For another example, the location information may be allocated by the CPE 100 to the CPE 100, for example, a location 1. If a collection time is arrived, the CPE 100 may determine whether a location change of the CPE 100 exceeds a specified distance interval. If the location change of the CPE 100 exceeds the specified distance interval, the CPE 100 may allocate new location information to the CPE 100, for example, a location 2. The specified distance interval may be determined based on positioning precision of the CPE 100. For example, if the positioning precision of the CPE 100 is 2 meters (m), that is, the CPE 100 may position a location change with a straight-line distance of 2 in. the specified distance interval may be 2 m. If the positioning precision of the CPE 100 is 3 in. the specified distance interval may be 3 m.

Figure 7:
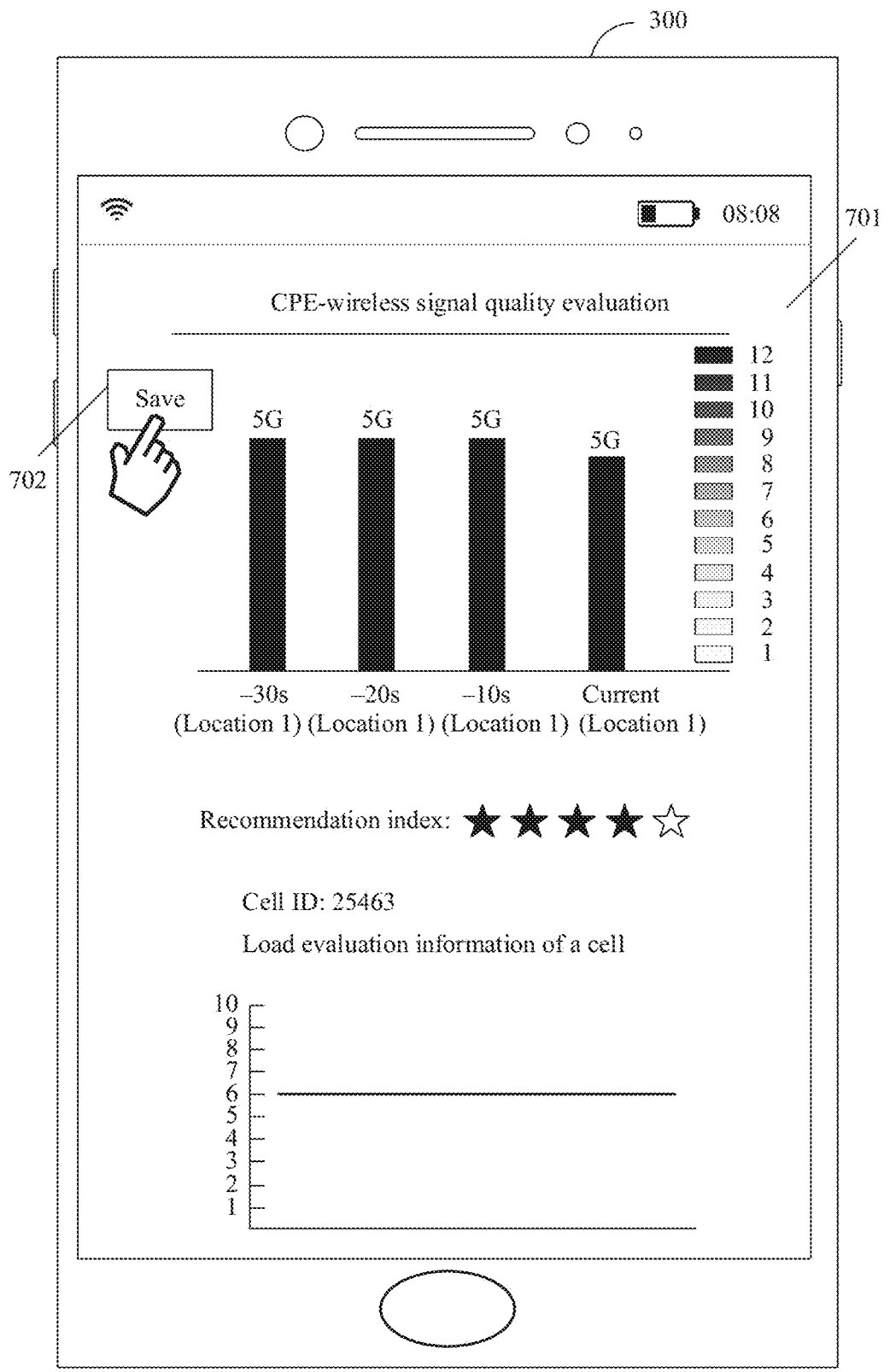
FIG. 7 is a schematic diagram of another display interface for evaluating wireless signal quality according to an embodiment of this application.

Correspondingly, the evaluation result may further include location information corresponding to the collection time. The mobile phone 300 may display the location information corresponding to the collection time. For example, it is assumed that when the CPE 100 obtains quality parameters corresponding to the column 504, the column 511, the column 512, and the column 513 shown in FIG. 5C, the CPE 100 is at the location 1. As shown in FIG. 7, the CPE 100 is at the location 1 at −30 s, the CPE 100 is at the location 1 at −20 s, and the CPE 100 is at the location 1 at −10 s. In addition, the CPE 100 is also at the location 1 at the current collection time.

Further, the mobile phone 300 may prompt the user to enter the location information of the CPE 100, and display the location information entered by the user.

In some embodiments, in response to a second operation performed by the user on a first interface, the mobile phone 300 may display a second interface. For example, the second operation may be a tap operation performed by the user on a "save" key 702 on a first interface 701 shown in FIG. 7. Alternatively, the second operation may be a setting gesture entered by the user on the first interface 701, for example, an S-shaped gesture. In response to the tap operation performed by the user on the "save" key 702 on the first interface 701 shown in FIG. 7, the mobile phone 300 may display a second interface 801 shown in FIG. 8(a). The second interface 801 includes an "input box" 802, first prompt information "please set or select a location name", an "OK" key, and a "cancel" key. The "input box" 802 is used to input the location name set by the user. The location information obtained by the CPE 100 may be displayed in the "input box" 802, for example, the location 1. The "input box" 802 further includes a drop-down key 803. In response to a tap operation performed by the user on the drop-down key 803, the mobile phone 100 may display a plurality of location names, such as a living room, a bedroom, and a study (not shown in the accompanying drawing). The plurality of location names are preset on the APP. Alternatively, the plurality of location names may be location names that have been set by the user.

The mobile phone 300 may receive a fourth operation performed by the user on the second interface. In response to the fourth operation, the mobile phone 300 may display a fourth interface. The fourth interface includes historical signal quality information. The historical signal quality information includes a quality parameter, a recommendation index, and a standard parameter that are of a wireless signal received at a location corresponding to a location name entered by the user in the "input box" 802 on the second interface.

Figure 8A:
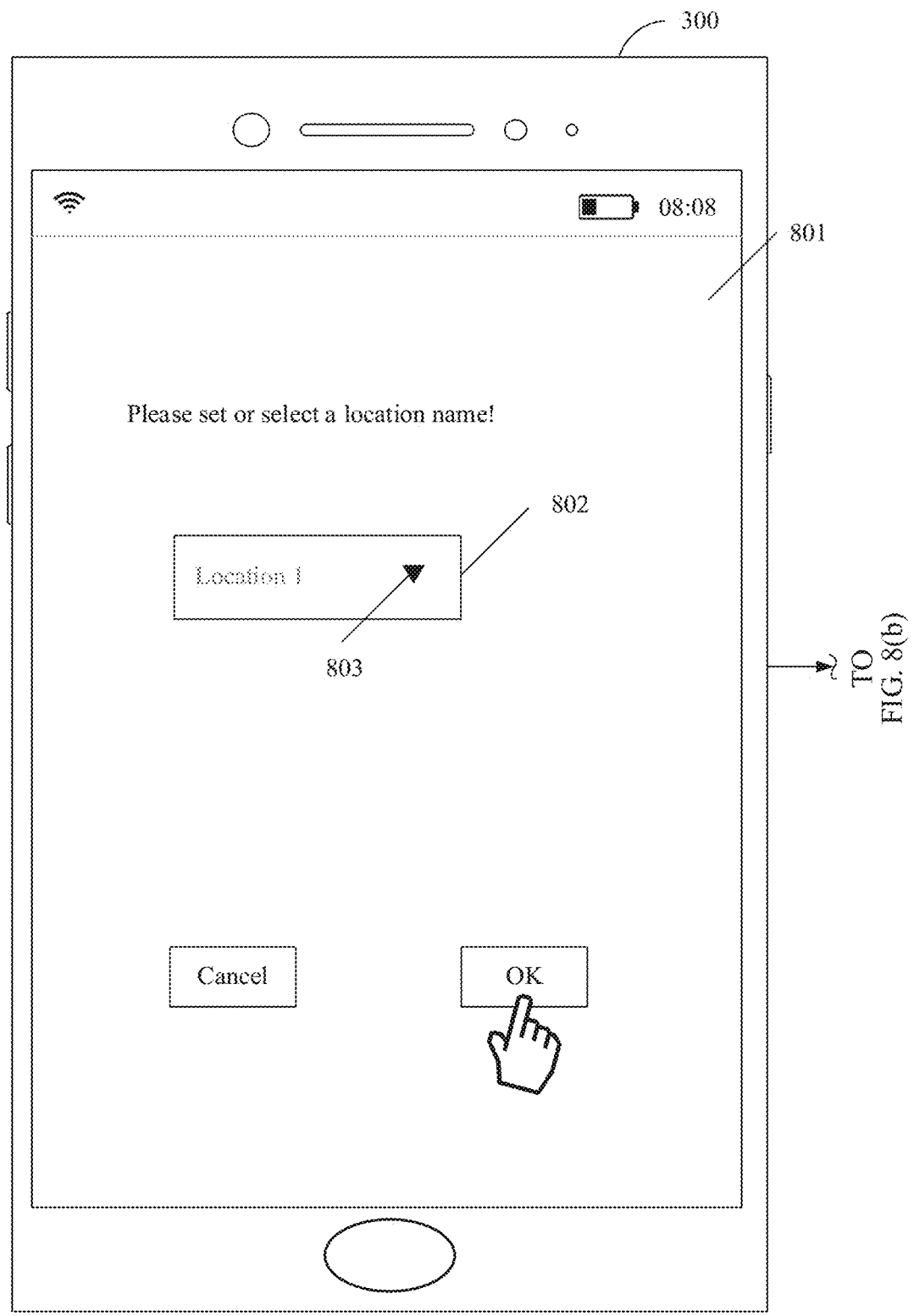
FIG. 8(*a*) and FIG. 8(*b*) are a schematic diagram of another display interface for evaluating wireless signal quality according to an embodiment of this application.
Figure 8B:
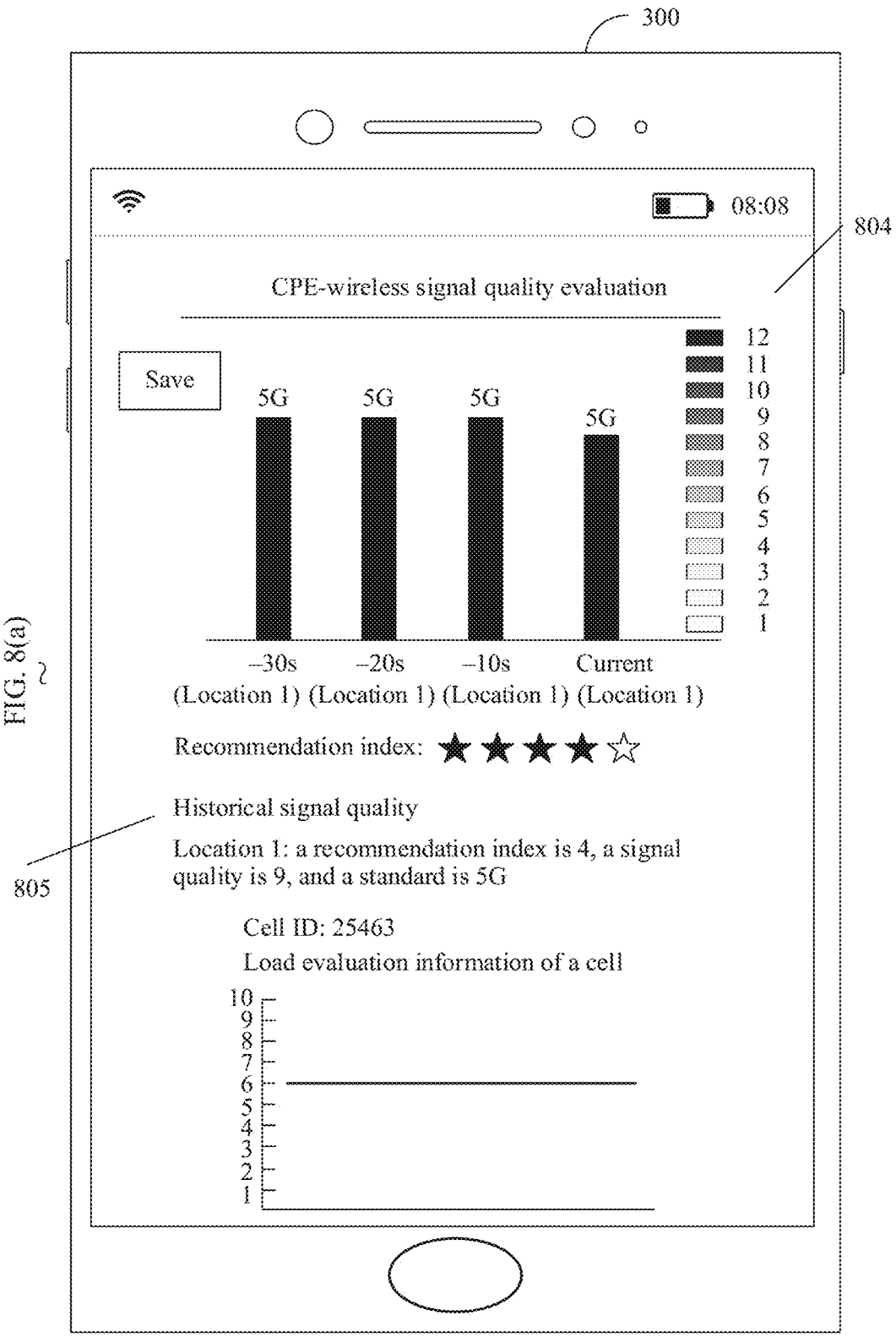

If the user does not input or select a location name in the "input box" 802, but directly clicks the "OK" key shown in FIG. 8(a), it indicates that the location name set by the user is the location 1. In response to a tap operation (namely, the fourth operation) performed by the user on the "OK" key shown in FIG. 8(a), the mobile phone 300 may display a fourth interface 804 shown in FIG. 8(b). The fourth interface 804 includes a quality parameter 9, a recommendation index 4, and a standard parameter 5G that are of a wireless signal received at the location 1, where the location 1 is entered by the user in the "input box" 802 on the second interface shown in FIG. 8(*a*).

In some other embodiments, in response to that the location change of the CPE 100 exceeds the specified distance interval, the CPE 100 may indicate the mobile phone 300 to display the second interface. For example, the location of the CPE 100 is a location 2 corresponding to a column 902 on a first interface 901 shown in FIG. 9(*a*). In other words, the CPE 100 moves from the location 1 to the location 2. When the location change of the CPE 100 exceeds the specified distance interval, a new location (for example, the location 2) may be allocated to the CPE 100. In this case, the CPE 100 may indicate the mobile phone 300 to display a second interface 903 shown in FIG. 9(*a*). The second interface 903 includes an "input box" 904. The "input box" 904 further includes a drop-down key 905.

Figure 9A:
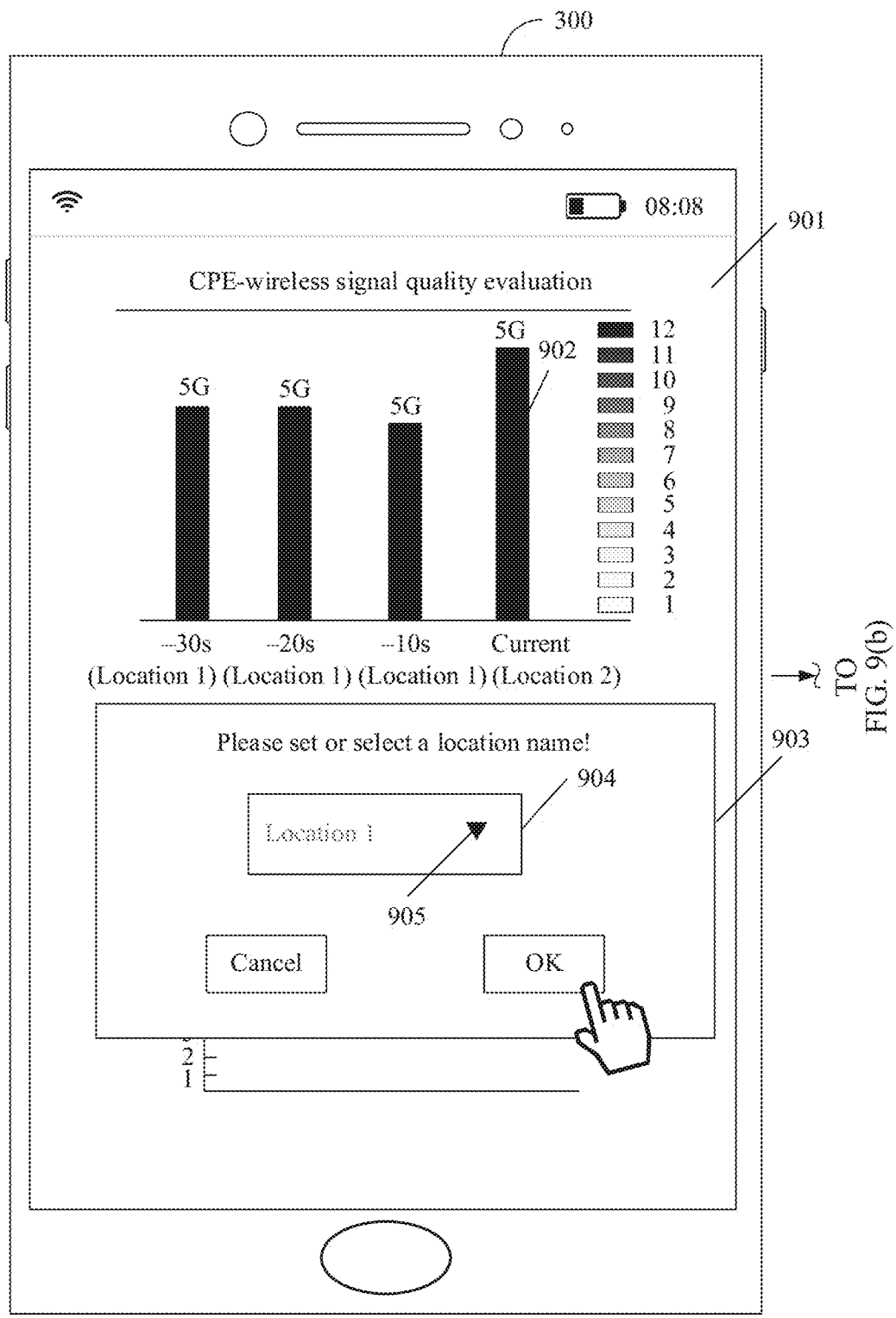
FIG. 9(*a*) and FIG. 9(*b*) are a schematic diagram of another display interface for evaluating wireless signal quality according to an embodiment of this application.
Figure 9B:
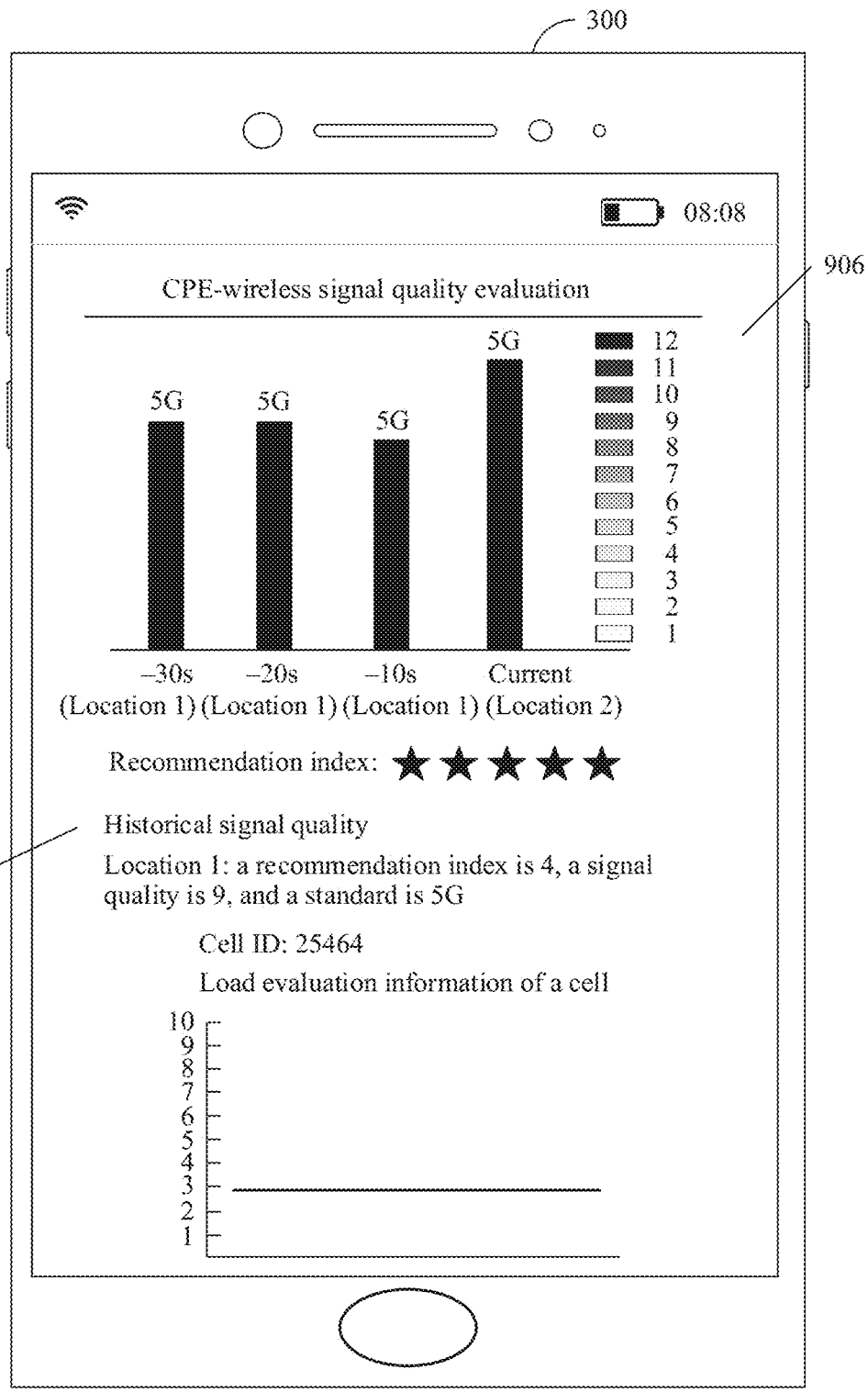

If the user does not input or select a location name in the "input box" 904, but directly clicks an "OK" key shown in FIG. 9(*a*), it indicates that the location name set by the user is the location 1. In response to a tap operation (namely, the fourth operation) performed by the user on the "OK" key shown in FIG. 9(*a*), the mobile phone 30) may display a fourth interface 906 shown in FIG. 9(*b*). The fourth interface 906 includes a quality parameter 9, a recommendation index 4, and a standard parameter 5G that are of a wireless signal received at the location 1 entered by the user in the "input box" 904 on the second interface shown in FIG. 9(*a*).

It should be noted that, after the CPE 100 moves from the location 1 to the location 2, the quality parameter of the wireless signal received by the CPE 100 may change. For example, as shown in FIG. 9(*b*), the quality parameter of the wireless signal received by the CPE 100 at −10 s is 8, and the quality parameter of the wireless signal received by the CPE 100 at the current collection time is 11. In addition, the cell accessed by the CPE 100 may also change. For example, as shown in FIG. 9(*b*), a cell ID of a cell accessed by the CPE 100 at the location 2 is 25464, and as shown in FIG. 8(*b*), a cell ID of a cell accessed by the CPE 100 at the location 1 is 25463. In addition, the recommendation index of the wireless signal received by the CPE 100 may also change. For example, as shown in FIG. 9(*b*), a recommendation index of a wireless signal received by the CPE 100 at the location 2 is five stars, but a recommendation index of a wireless signal received by the CPE 100 at the location 1 is four stars shown in FIG. 8(*b*).

Further, in response to the tap operation (namely, the fourth operation) performed by the user on the "OK" key, the mobile phone 300 may further send the historical signal quality information to the CPE 100, for example, the quality parameter 9, the recommendation index 4, and the standard parameter 5G that are of the wireless signal received at the location 1, and the location 1. In this way, the CPE 100 may store the historical signal quality information sent by the mobile phone 300, so that the CPE 100 may send the historical signal quality information to another electronic device on which the "signal evaluation APP" is installed, and the another electronic device may present the historical signal quality information about the CPE 100 on the APP.

Figure 10:
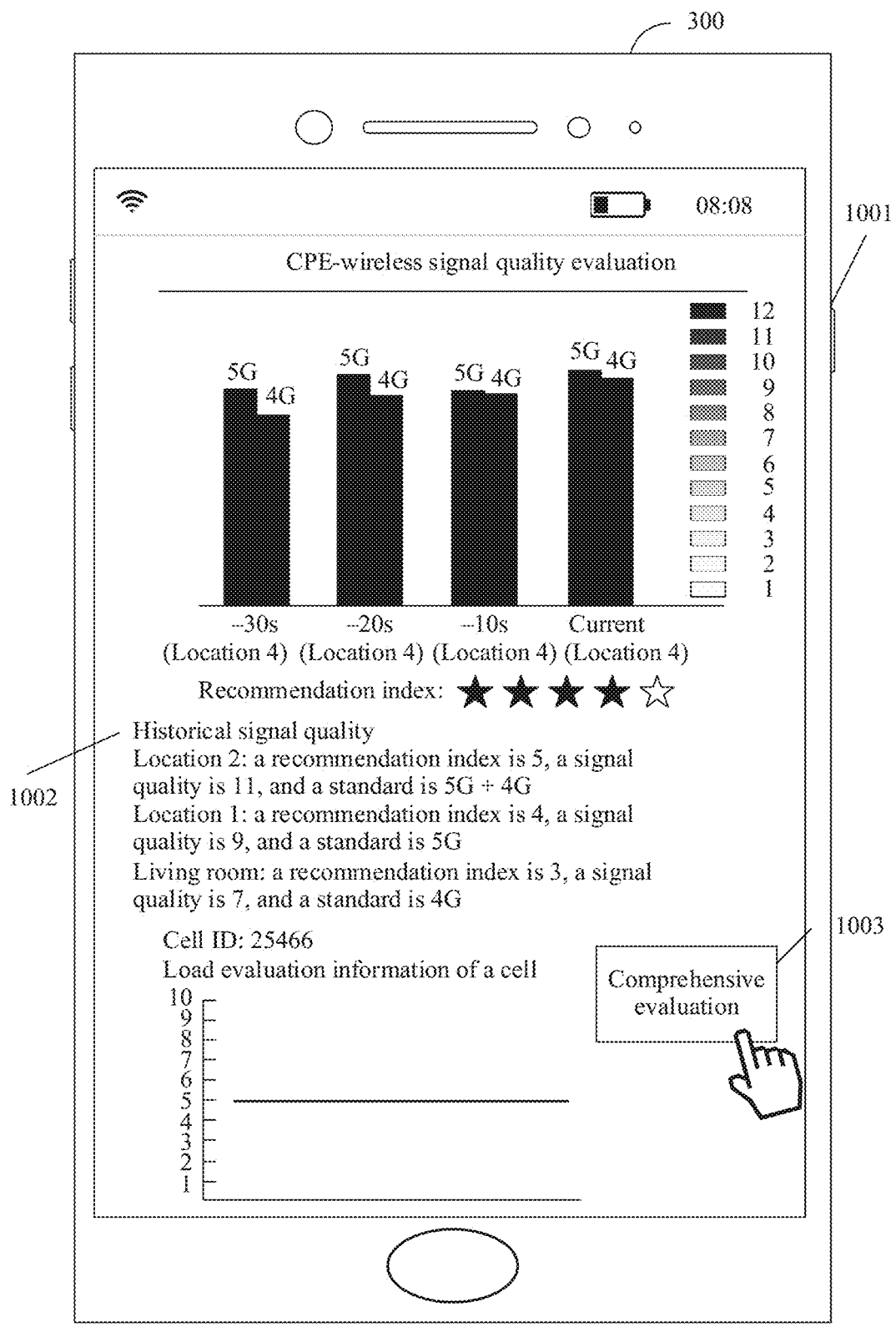
FIG. 10 is a schematic diagram of another display interface for evaluating wireless signal quality according to an embodiment of this application.

Over time, the location of the CPE 100 may change a plurality of times. Therefore, the historical signal quality information may include recommendation indexes of the CPE 100 at a plurality of locations, and quality parameters and standard parameters of wireless signals received at the plurality of locations. For example, as shown in FIG. 10, historical signal quality information 1002 may include the recommendation index 5 of the CPE 100 at the location 2, the quality parameter 11 and a standard parameter 5G+4G of the wireless signal received at the location 2, the recommendation index 4 of the CPE 100 at the location 1, the quality parameter 9 and the standard parameter 5G of the wireless signal received at the location 1, a recommendation index 3 of the CPE 100 in the living room, and a quality parameter 7 and a standard parameter 4G of a wireless signal received in the living room. Optionally, as shown in FIG. 10, the mobile phone 300 may sequentially display, in descending order of the recommendation indexes, the recommendation indexes of the CPE 100 at the plurality of locations, and the quality parameters and the standard parameters of the wireless signals received at the plurality of locations.

It may be understood that, when the user selects, with reference to the quality parameter of the wireless signal and the load evaluation value of the cell, the location for placing the CPE, there may be some locations with relatively high wireless signal quality but relatively large cell load evaluation values, or some other locations with relatively poor wireless signal quality but relatively small cell load evaluation values. In this case, it is difficult for the user to comprehensively evaluate the quality parameter of the wireless signal and the load evaluation value of the cell. Based on this case, the user may operate the mobile phone 300 to control the CPE 100 to comprehensively evaluate the quality parameters of the wireless signals received by the CPE 100 at the plurality of locations and load evaluation values of cells.

Specifically, the mobile phone 300 may receive the second operation performed by the user on the first interface. The second operation may be the setting gesture entered by the user on the first interface, for example, an upward-slide gesture. Alternatively, the second operation may be a tap operation performed by the user on a "comprehensive evaluation" key 1003 shown in FIG. 10. In response to the second operation, the mobile phone 300 may request the CPE 100 to comprehensively evaluate the quality parameters of the wireless signals received at the plurality of locations and the load evaluation values of the cells.

The CPE 100 may calculate a comprehensive evaluation value of the CPE 100 at a location by using a comprehensive evaluation algorithm based on a quality parameter of a wireless signal received by the CPE 100 at the location (for example, an average value of quality parameters of wireless signals received by the CPE 100 at a plurality of collection times when the CPE 100 is at the location) and a load evaluation value. The comprehensive evaluation value may reflect wireless communication experience of the CPE 100 when the CPE 100 accesses a network at the location. For example, the comprehensive evaluation algorithm may be $Q=K \times k + F \times f$.

Q is a comprehensive evaluation value of the CPE 100 at a location. K is a quality parameter of a wireless signal received by the CPE 100 at the location, and k is a weighted value of wireless signal quality. F is a load evaluation value of the location, and f is a weighted value of the load evaluation value.

A value range of the comprehensive evaluation value is 1 to R, and R is a positive integer. For example, R=10, R=12, or R=5. The value range of the comprehensive evaluation value is affected by a value range of the quality parameter of the wireless signal and a value range of the load evaluation value, the weighted value k, and the weighted value f. For example, it is assumed that both the value range of the quality parameter of the wireless signal and the value range of the load evaluation value are 1 to 12, and k+f=1. In this case, the value range of the comprehensive evaluation value is 1 to 12.

In this embodiment of this application, the comprehensive evaluation algorithm, the weighted value k, and the weighted value f may be sent by the wireless base station to the CPE 100. The CPE 100 may receive and store the comprehensive evaluation algorithm, the weighted value k, and the weighted value f. The wireless base station may perform a large quantity of tests, and determine the comprehensive evaluation algorithm, the weighted value k, and the weighted value f based on the wireless signal quality and a degree of impact of cell load on the wireless communication experience.

After obtaining the comprehensive evaluation value through calculation, the CPE 100 may send the collection time and the comprehensive evaluation value to the mobile phone 300. The mobile phone 300 may display the comprehensive evaluation value and corresponding location information. For example, in response to a tap operation performed by the user on the "comprehensive evaluation" key 1003 shown in FIG. 10, the mobile phone 300 may display a third interface 1101 shown in FIG. 11. An example in which the value range of the comprehensive evaluation value is 1 to 10 is used. The third interface 1101 includes a comprehensive evaluation value 6 of the CPE 100 at the location 2, a comprehensive evaluation value 5 of the CPE 100 at the location 1, a comprehensive evaluation value 4 of the CPE 100 in the living room, and a comprehensive evaluation value 7 of the CPE 100 at a current location (for example, a location 4).

Figure 11:
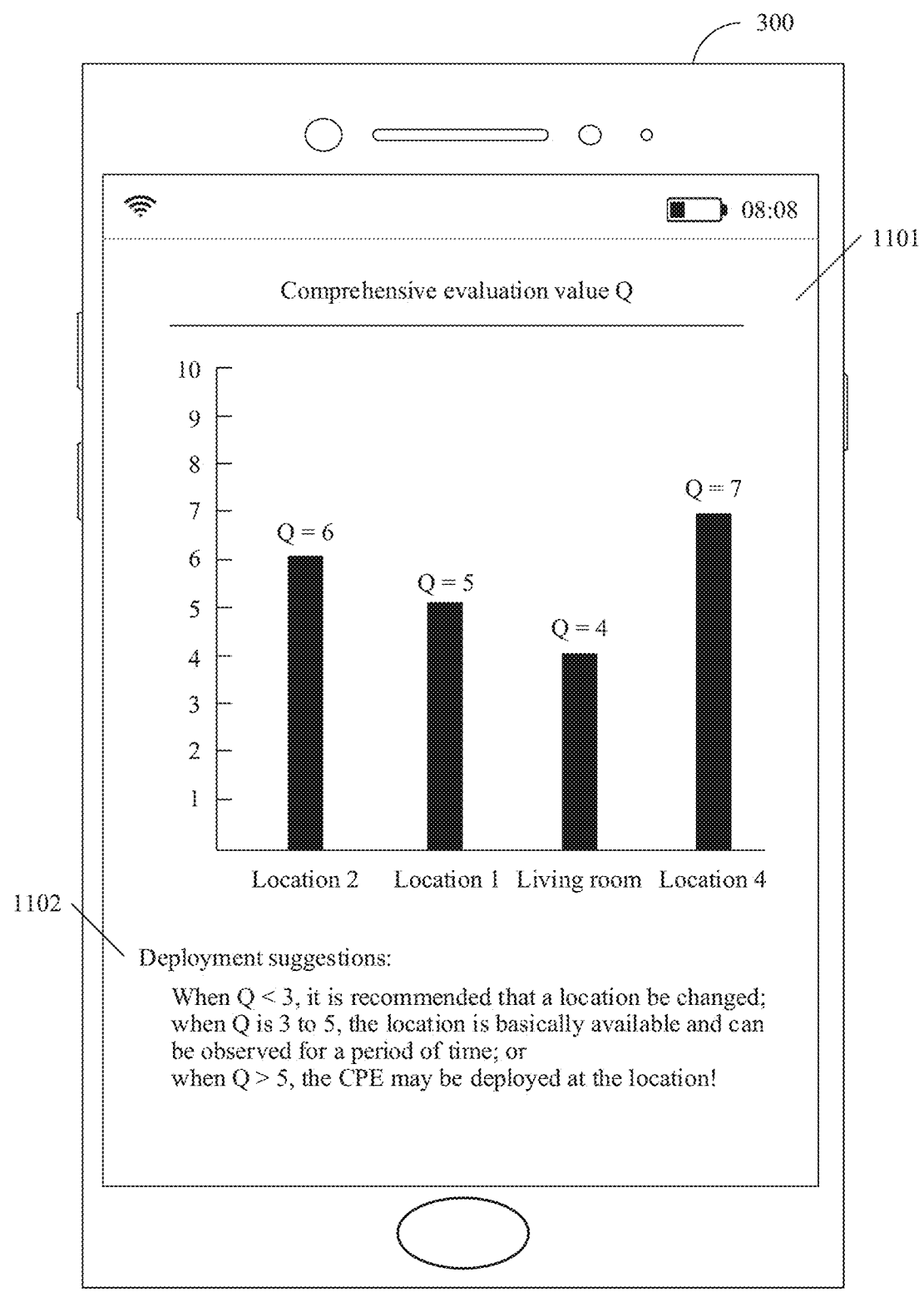
FIG. 11 is a schematic diagram of another display interface for evaluating wireless signal quality according to an embodiment of this application.

Optionally, as shown in FIG. 11, the third interface 1101 further includes a deployment suggestion 1102. The deployment suggestion 1102 is used to indicate, to the user, a principle for selecting a CPE location based on a comprehensive evaluation value. For example, the deployment suggestion 1102 may be "when Q<3, it is recommended that a location be changed; when Q is 3 to 5, the location is basically available and can be observed for a period of time: or when Q is greater than 5, the CPE may be deployed at the location!".

In this embodiment of this application, comprehensive evaluation may be performed on the quality parameter of the wireless signal received by the CPE 100 and the load evaluation value of the cell, to obtain the comprehensive evaluation value. Then, comprehensive evaluation values of a plurality of locations are presented to the user. In this way, the user may directly select a location with a relatively high comprehensive evaluation value from the plurality of locations to place the CPE 100.

Optionally, in this embodiment of this application, the mobile phone 300 or the CPE 100 may further send an alarm indication when the comprehensive evaluation value at the current location is less than a specified evaluation threshold. The alarm indication is used to prompt the user to change the location of the CPE 100. For example, the specified evaluation threshold may be 3. For example, the alarm indication may be a voice alarm indication. Alternatively, the mobile phone 300 may display a reminder message including the alarm indication (for example, signal quality at this location is relatively poor, please move the CPE!).

In some embodiments, a planar structural diagram of a house may be stored in the CPE 100. The CPE 100 displays corresponding signal quality information at different locations in the planar structural diagram. In this way, the signal quality information about the different locations can be more vividly presented to the user.

Figure 12:
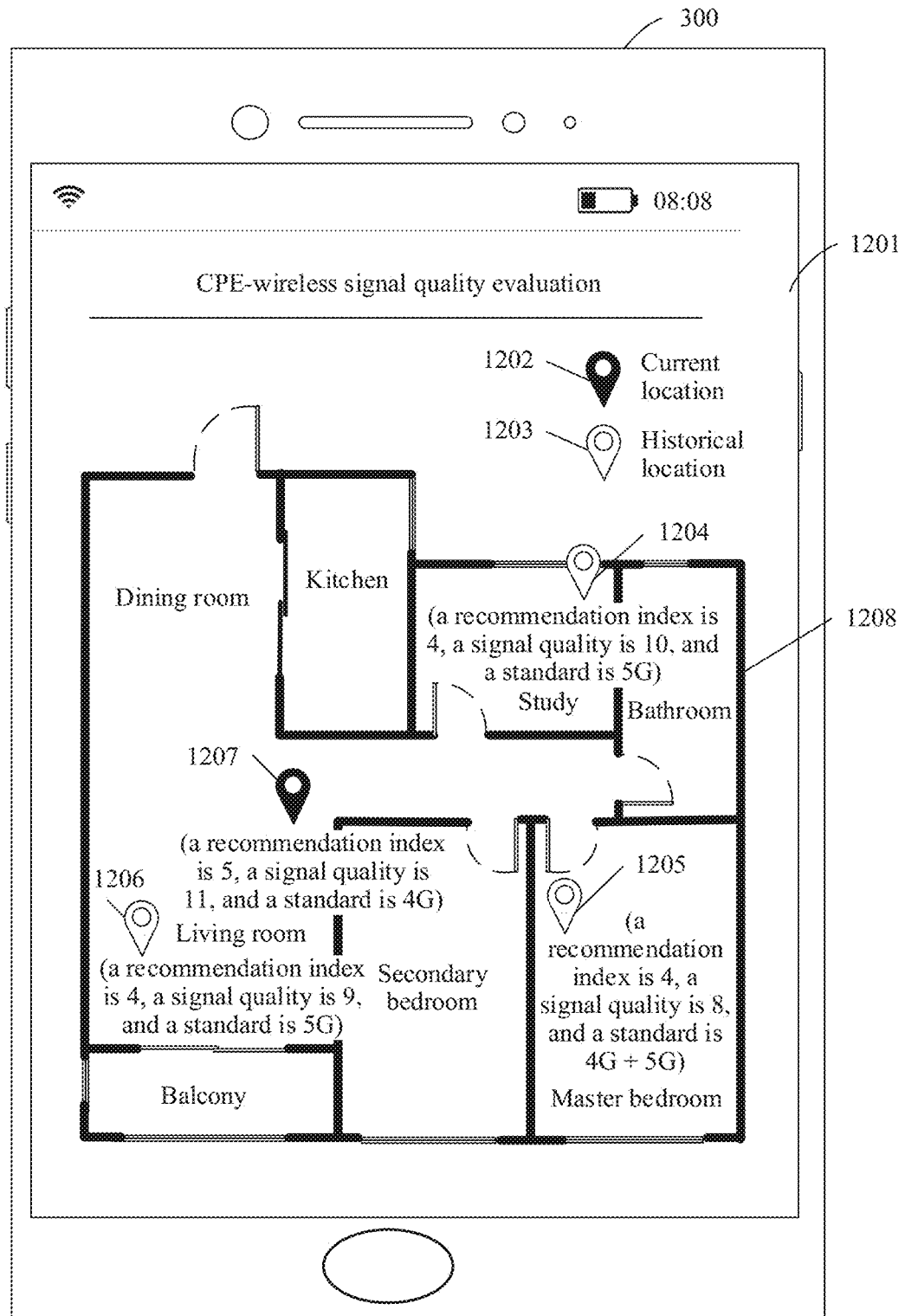
FIG. 12 is a schematic diagram of another display interface for evaluating wireless signal quality according to an embodiment of this application.

For example, the mobile phone 300 may display a first interface 1201 shown in FIG. 12. A positioning icon 1202 on the first interface 1201 is a positioning icon of the current location, and a positioning icon 1203 is a positioning icon of a historical location. As shown in FIG. 12, the first interface 1201 includes a planar structural diagram 1208 of a house. The planar structural diagram 1208 of the house shows a plane structure of the house, including a living room, a dining room, a master bedroom, a secondary bedroom, a study, a kitchen, and a bathroom. A plurality of positioning icons and signal quality information about corresponding locations are marked in the planar structural diagram 1208 of the house. For example, the master bedroom is marked with a positioning icon 1205, and a recommendation index 4, a signal quality parameter 8, and a network standard 4G+5G of a location corresponding to the positioning icon 1205. The study is marked with a positioning icon 1204, and a recommendation index 4, a signal quality parameter 12, and a network standard 5G of a location corresponding to the positioning icon 1204. It should be noted that signal quality information may be different at different locations in one space of the planar structural diagram 1208 of the house. For example, the living room is marked with a positioning icon 1206 and a positioning icon 1207. A recommendation index of a location corresponding to the positioning icon 1206 is 4, a signal quality parameter of the location is 9, and a network standard of the location is 5G. A recommendation index of a location corresponding to the positioning icon 1207 is 5, a signal quality parameter of the location is 11, and a network standard of the location is 4G.

The cloud server may store planar structural diagrams of houses in a plurality of buildings. The CPE 100 or the mobile phone 300 may select, in response to an operation of the user, a planar structural diagram that is of a house and that corresponds to the current location from a plurality of planar structural diagrams that are of houses and provided by the cloud server.

It may be understood that the mobile phone 300 vividly presents the signal quality information about the different locations to the user in the planar structure diagram 1208 of the house shown in FIG. 12. In this way, the user may compare signal quality information about locations corresponding to the positioning icons shown in FIG. 12, and select an ideal location to place the CPE 100.

In another embodiment, if the CPE 100 is attached to the network, the CPE 100 may perform the following steps according to a specified distance interval: obtaining an evaluation parameter (that is, S408 is performed): evaluating, based on the evaluation parameter, quality of the wireless signal received by the CPE 100, to obtain an evaluation result through calculation (that is, S40) is performed); and sending the evaluation result to the mobile phone 300 (that is, S410 is performed). That the CPE 100 performs S408 to S410 according to the specified distance interval specifically means that the CPE 100 performs S408 to S410 in response to that a location change of the CPE 100 exceeds the specified distance interval.

In this embodiment, the evaluation parameter may include at least two of a strength parameter (for example, RSRP) of a wireless signal received by the CPE 100 at a collection location, an interference parameter (for example, an SINR) of the wireless signal received by the CPE 100 at the collection location, a standard parameter of a network corresponding to the wireless signal received by the CPE 100 at the collection location, a quantity of access paths (for example, a RANK) of the wireless signal received by the CPE 100 at the collection location, and a CQI of the wireless signal received by the CPE 100 at the collection location. For the RSRP, the SINR, the standard parameter, the RANK, and the CQI, and the method for obtaining the evaluation result through calculation based on the evaluation parameter, refer to related descriptions in the foregoing example. Details are not described again in this embodiment of this application.

In this embodiment, the evaluation result may include a quality parameter of the wireless signal received by the CPE 100 at the collection time and information about the collection location. After receiving the evaluation result, the mobile phone 300 may present the evaluation result in a specified manner on the "signal evaluation APP" (that is, S411 is performed).

In the DC scenario, the quality parameter of the wireless signal received by the CPE 100 at the collection location includes a quality parameter $K_{5G}$ of a first wireless signal (for example, a 5G signal) received by the CPE 100 at the collection location and a quality parameter $K_{4G}$ of a second wireless signal ($K_{4G}$) received by the CPE 100 at the collection time.

Figure 13:
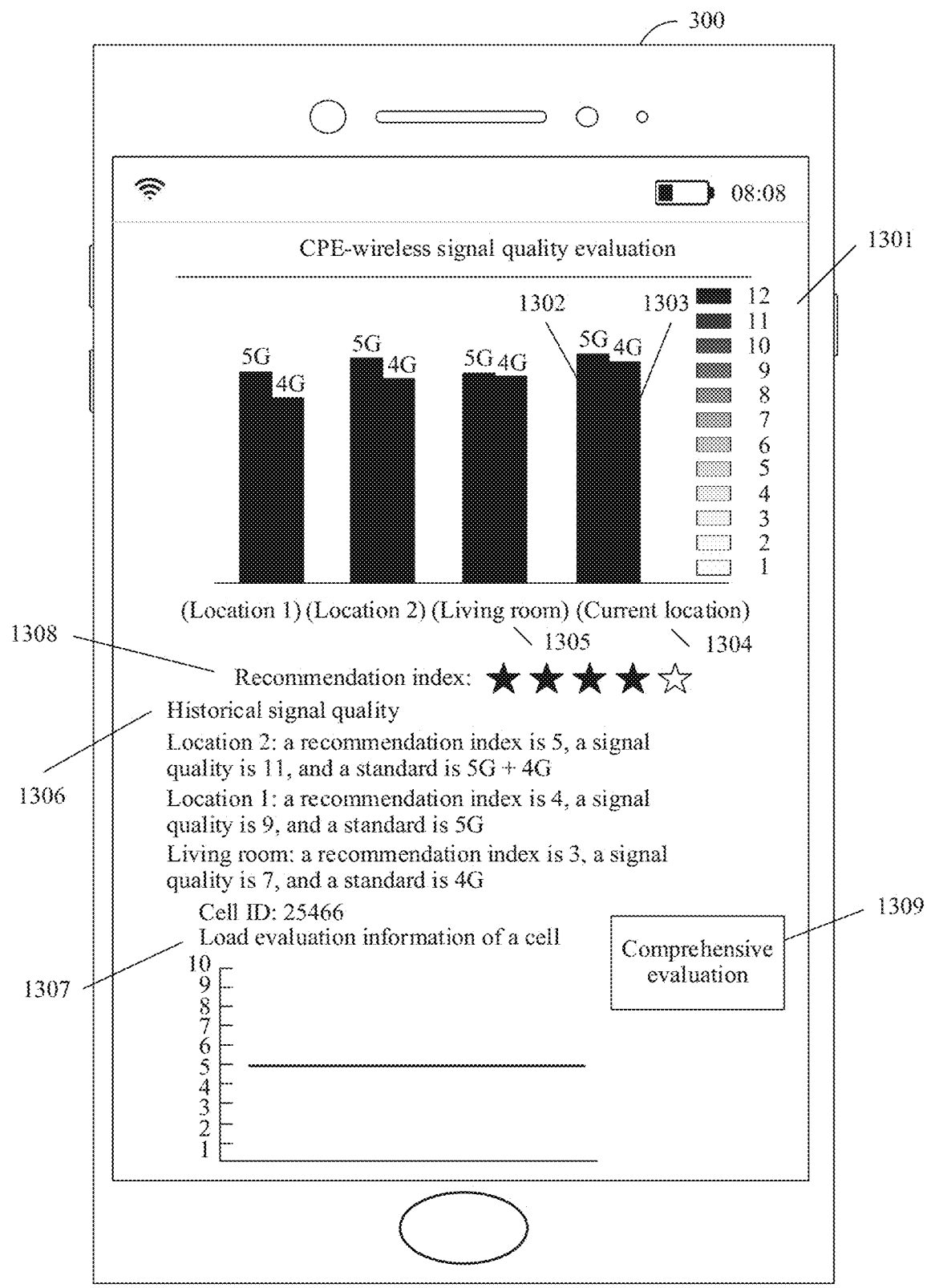
FIG. 13 is a schematic diagram of another display interface for evaluating wireless signal quality according to an embodiment of this application.

For example, as shown in FIG. 13, a first interface 1301 displayed by the mobile phone 300 includes a column 1302 and a column 1303 that correspond to a current location 1304 (namely, a current collection location). A height of the column 1303 may represent a size of $K_{4G}$. A higher column 1303 indicates larger $K_{4G}$. A height of the column 1302 may represent a size of $K_{5G}$. A higher column 1302 indicates larger $K_{5G}$.

Further, the mobile phone 300 may display a quality parameter of a wireless signal received by the CPE 100 at a previous collection location. For example, as shown in FIG. 13, the first interface 1301 further includes a column corresponding to a living room 1305 (namely, the previous collection location). A height of the column corresponding to the living room 1305 may represent quality of a wireless signal received by the CPE 100 in the living room.

Optionally, the evaluation result may further include a recommendation index of the wireless signal received by the CPE 100 at the collection location. The recommendation index may represent quality of the wireless signal received by the CPE 100 at the collection location. A higher recommendation index indicates higher quality of the wireless signal received by the CPE 100 at the collection location. A value range of the recommendation index may be 1 to M, and the recommendation index is a positive integer. For example, M=5, or M=6. For example, as shown in FIG. 13, the first interface 1301 further includes a recommendation index 1308 of a wireless signal received by the CPE 100 at the current collection location (namely, the current location 1304). The recommendation index 1308 is four stars, that is, the recommendation index 1308 is equal to 4. For a method for calculating the recommendation index by the CPE 100 or the mobile phone 300, refer to related descriptions in the foregoing embodiment. Details are not described herein again in this embodiment of this application.

Optionally, in this embodiment of this application, the mobile phone 300 or the CPE 100 may further send an alarm indication when the recommendation index is less than a specified index threshold. The alarm indication is used to prompt the user to change the location of the CPE 100. The specified index threshold is a positive integer greater than 0 and less than M. For example, when M=5, the specified index threshold may be 2 or 3. For example, the alarm indication may be a voice alarm indication. Alternatively, the mobile phone 300 may display a reminder message including the alarm indication (for example, signal quality at this location is relatively poor, please move the CPE!).

Optionally, the evaluation result may further include a standard parameter of a network to which the CPE 100 is attached. For example, as shown in FIG. 13, a standard parameter 5G is marked on the column 1302. The standard parameter 5G indicates that the column 1302 is used to represent a value of a quality parameter of a wireless signal received by the CPE 100 in the 5G network. For example, as shown in FIG. 13, a standard parameter 4G is marked on the column 1303. The standard parameter 4G indicates that the column 1303 is used to represent a value of a quality parameter of a wireless signal received by the CPE 100 in the 4G network.

In some embodiments, if the CPE 100 is attached to the network, the CPE 100 may further send a load request to the wireless base station accessed by the CPE 100. The load request is used to obtain, from the wireless base station, load evaluation information of a cell in which the CPE 100 is located. The load evaluation information of the cell represents a load status, at the collection location, of the cell accessed by the CPE 100. For the load evaluation information and a method for obtaining the load evaluation information by the CPE 100, refer to related descriptions in the foregoing embodiment. Details are not described herein again in this embodiment of this application.

For example, the first interface 1301 displayed by the mobile phone 300 includes load evaluation information 1307 about the cell. The load evaluation information 1307 about the cell includes a load evaluation value of the cell accessed by the CPE 100. For example, the load evaluation value is 6. Optionally, the first interface 1301 may further include a cell ID of a cell accessed by the CPE 100 at the current collection time. For example, the cell ID may be 25466.

It should be noted that, when the CPE 100 performs S408 to S410 according to the specified distance interval, the CPE 100 may further respond to an operation of the user, and comprehensively evaluate the quality parameter of the wireless signal received by the CPE 100 and the load evaluation value of the cell. For example, as shown in FIG. 13, the first interface 1301 further includes a "comprehensive evaluation" key 1309.

In some other embodiments, as shown in FIG. 2, the CPE 100 may include a display 290. The CPE 100 may display the evaluation result of the CPE 100 on the display 290. For example, the CPE 100 may display the first interface, a second interface, and a third interface on the display 290.

It may be understood that, if the evaluation result is displayed by the CPE 100, when moving the CPE 100, the user may directly observe, on the CPE 100, parameters such as quality parameters, load evaluation values, or comprehensive evaluation values of wireless signals received by the CPE 100 at different locations. The CPE 100 displays the evaluation result, so that it is convenient for the user to view the evaluation result, and user experience of CPE wireless signal evaluation is improved.

An embodiment of this application further provides an electronic device, and the electronic device is the first electronic device. For example, the electronic device is the CPE 100. For a structure of the electronic device, refer to the structure of the CPE 100 shown in FIG. 2. A memory of the electronic device may store one or more computer programs. The one or more computer programs include instructions. When a processor of the electronic device executes the instructions, the electronic device may perform the functions or steps performed by the CPE 100 in the descriptions of the foregoing method embodiments.

An embodiment of this application further provides a computer storage medium. The computer storage medium includes computer instructions. When the computer instructions are run on the electronic device (namely, the first electronic device or the CPE 100), the electronic device is enabled to perform the functions or steps performed by the CPE 100 in the descriptions of the foregoing method embodiments.

An embodiment of this application further provides a computer program product. When the computer program product runs on a computer, the computer is enabled to perform the functions or steps performed by the CPE 100 in the descriptions of the foregoing method embodiments.

Some other embodiments of this application further provide a display apparatus, and the display apparatus is the second electronic device. For example, the display apparatus is the mobile phone 300. For a structure of the display apparatus, refer to the structure of the mobile phone 300 shown in FIG. 3. A memory of the display apparatus may store one or more computer programs. The one or more computer programs include instructions. When a processor of the display apparatus executes the instructions, the display apparatus may perform the functions or steps performed by the mobile phone 300 in the descriptions of the foregoing method embodiments.

An embodiment of this application further provides a computer storage medium. The computer storage medium includes computer instructions. When the computer instructions are run on the display apparatus (namely, the second electronic device), the display apparatus is enabled to perform the functions or steps performed by the mobile phone 300 in the descriptions of the foregoing method embodiments.

An embodiment of this application further provides a computer program product. When the computer program product runs on a computer, the computer is enabled to perform the functions or steps performed by the mobile phone 300 (namely, the display apparatus) in the descriptions of the foregoing method embodiments.

An embodiment of this application further provides a wireless signal quality evaluation system. The wireless signal quality evaluation system includes the first electronic device, the second electronic device, and a cloud server. The cloud server is configured to receive a signal evaluation request, sent by the second electronic device, of an APP, where the APP is configured to control the first electronic device to evaluate quality of a wireless signal, and the signal evaluation request is used to request the first electronic device to evaluate quality of a wireless signal received by the first electronic device. The cloud server is further configured to send the signal evaluation request to the first electronic device, receive an evaluation result sent by the first electronic device, and send the evaluation result to the second electronic device. The evaluation result includes a quality parameter of a wireless signal received by the first electronic device at a collection time or a collection location and information about the collection time or the collection location. The quality parameter of the wireless signal is obtained through calculation by using at least two of the following parameters: a strength parameter of the wireless signal, an interference parameter of the wireless signal, a standard parameter of a network corresponding to the wireless signal, a quantity of access paths of the wireless signal, and a CQI of the wireless signal.

The foregoing descriptions about implementations allow a person skilled in the art to clearly understand that, for the purpose of convenient and brief description, division into only the foregoing function modules is used as an example for description. In actual application, the foregoing functions can be allocated to different function modules for implementation based on a requirement. In other words, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this embodiment, it should be understood that the disclosed system, apparatus, and method may be implemented in another manner. For example, the foregoing apparatus embodiments are merely an example. For example, the module or unit division is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this embodiment may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in this embodiment essentially, or the part contributing to the prior art, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments, but are not intended to limit the protection scope of the embodiments. Any variation or replacement within the technical scope disclosed in the embodiments shall fall within the protection scope of the embodiments. Therefore, the protection scope of the embodiments shall be subject to the protection scope of the claims.

What is claimed is:

1. An electronic device, comprising:
a display;
a memory configured to store computer program code; and
a processor coupled to the display and the memory and configured to run the computer program code to cause the electronic device to:
send a signal evaluation request to another electronic device;
receive, in response to the signal evaluation request, an evaluation result from the other electronic device according to a specific period, wherein the evaluation result comprises a first quality parameter of a first wireless signal received by the other electronic device at a collection time, information about the collection time, and a recommendation index that represents a quality of the first wireless signal and is based on the first quality parameter, and wherein the first quality parameter is based on at least two of: a strength parameter of the first wireless signal, an interference parameter of the first wireless signal, a standard parameter of a network corresponding to the first wireless signal, a quantity of access paths of the first wireless signal, or a channel quality indicator (CQI) of the first wireless signal;
display the first quality parameter using the display;
display the recommendation index based on the information about the collection time; and
provide an audible or visual indication on the electronic device when the recommendation index is less than a threshold.

2. The electronic device of claim 1, wherein the processor is further configured to cause the electronic device to display a second quality parameter of a second wireless signal received by the other electronic device at a previous collection time.

3. The electronic device of claim 1, wherein the evaluation result further comprises the standard parameter, wherein the standard parameter indicates a network standard of the first wireless signal, and wherein the processor is further configured to cause the electronic device to display the network standard.

4. The electronic device of claim 1, wherein the processor is further configured to cause the electronic device to:
receive an indication message from the other electronic device, wherein the indication message indicates that the other electronic device is not attached to a wireless network; and
display prompt information indicating that no wireless network is attached or a network connection has failed.

5. The electronic device of claim 1, wherein the processor is further configured to cause the electronic device to send an alarm indication when the recommendation index is less than a specified index threshold, and wherein the alarm indication prompts a user to change a location of the other electronic device.

6. The electronic device of claim 1, wherein the first quality parameter comprises a second quality parameter of a second wireless signal received by the other electronic device at the collection time and a third quality parameter of a third wireless signal received by the other electronic device at the collection time, wherein the second wireless signal and the third wireless signal comply with different network standards, and wherein the processor is further configured to cause the electronic device to:
display the second quality parameter; and
display the third quality parameter.

7. The electronic device of claim 1, wherein the processor is further configured to cause the electronic device to:
prompt a user to enter information about a current location of the other electronic device; and
display the location information.

8. The electronic device of claim 1, wherein the processor is further configured to cause the electronic device to:
receive, from the other electronic device, load evaluation information of a cell accessed by the other electronic device, wherein the load evaluation information of the cell represents a load status of the cell at the collection time; and
display the load evaluation information.

9. The electronic device of claim 8, wherein the processor is further configured to cause the electronic device to:
send a comprehensive evaluation request to the other electronic device; and
receive, from the other electronic device, a comprehensive evaluation value of the first wireless signal, wherein the comprehensive evaluation value is based on the first quality parameter of the first wireless signal and the load status.

10. The electronic device of claim 1, wherein the other electronic device is customer-premises equipment (CPE), and wherein the electronic device is a mobile phone or a tablet computer.

11. An electronic device comprising:
a display;
a memory configured to store computer program code; and
a processor coupled to the display and the memory and configured to run the computer program code to cause the electronic device to:
send a signal evaluation request to another electronic device;
receive, in response to the signal evaluation request, an evaluation result from the other electronic device according to a specific distance interval, wherein the evaluation result comprises a first quality parameter of a first wireless signal received by the other electronic device at a collection location, information about the collection time, and a recommendation index that represents a quality of the first wireless signal and is based on the first quality parameter, and wherein the first quality parameter is based on at least two of: a strength parameter of the wireless signal, an interference parameter of the first wireless signal, a network standard parameter of the first wireless signal, a quantity of access paths of the first wireless signal, or a channel quality indicator (CQI) of the first wireless signal;
display the recommendation index based on the information about the collection time; and
display the first quality parameter using the display.

12. The electronic device of claim 11, wherein the processor is further configured to cause the electronic device to display a second quality parameter of a second wireless signal received by the other electronic device at a previous collection location.

13. The electronic device of claim 11, wherein the evaluation result further comprises the network standard parameter, wherein the network standard parameter indicates a network standard of the first wireless signal, and wherein the processor is further configured to cause the electronic device to display the network standard of the first wireless signal.

14. The electronic device of claim 11, wherein the first quality parameter comprises a second quality parameter of a second wireless signal received by the other electronic device at the collection location and a third quality parameter of a third wireless signal received by the other electronic device at the collection location, wherein the second wireless signal and the third wireless signal comply with different network standards, and wherein the processor is further configured to cause the electronic device to:
display the second quality parameter; and
display the third quality parameter.

15. The electronic device of claim 11, wherein the processor is further configured to cause the electronic device to:
prompt a user to enter location information of the other electronic device; and
display the location information.

16. The electronic device of claim 11, wherein the processor is further configured to cause the electronic device to:
receive, from the other electronic device, load evaluation information of a cell accessed by the other electronic device, wherein the load evaluation information of the cell represents a load status of the cell at the collection location; and
display the load evaluation information.

17. The electronic device of claim 16, wherein the processor is further configured to cause the electronic device to:
send a comprehensive evaluation request to the other electronic device; and
receive, from the other electronic device, a comprehensive evaluation value of the first wireless signal, wherein the comprehensive evaluation value is based on the first quality parameter and the load status.

18. A computer program product comprising computer-executable instructions stored on a non-transitory computer-readable storage medium that, when executed by a processor cause an electronic device to:
send a signal evaluation request to another electronic device;
receive, in response to the signal evaluation request, an evaluation result from the other electronic device according to a specific period, wherein the evaluation result comprises a first quality parameter of a first wireless signal received by the other electronic device at a collection time, information about the collection time, and a recommendation index that represents a quality of the first wireless signal and is based on the first quality parameter, and wherein the first quality parameter is based on at least two of: a strength parameter of the first wireless signal, an interference parameter of the first wireless signal, a standard parameter of a network corresponding to the first wireless signal, a quantity of access paths of the first wireless signal, or a channel quality indicator (CQI) of the first wireless signal;
display the first quality parameter;
display the recommendation index based on the information about the collection time; and
provide an audible or visual indication on the electronic device when the recommendation index is less than a threshold.

19. The computer program product of claim 18, wherein the evaluation result further comprises the standard parameter, and wherein the standard parameter indicates a network standard of the first wireless signal.

20. The computer program product of claim 19, wherein the instructions, when executed by the processor cause the electronic device to display the network standard.

* * * * *